United States Patent
Emelie et al.

(10) Patent No.: US 10,825,405 B2
(45) Date of Patent: *Nov. 3, 2020

(54) ELECTRO-OPTIC DISPLAYS

(71) Applicant: E INK CORPORATION, Billerica, MA (US)

(72) Inventors: Pierre-Yves Emelie, Mountain View, CA (US); Teck Ping Sim, Acton, MA (US); Kenneth R. Crounse, Somerville, MA (US); Karl Raymond Amundson, Cambridge, MA (US); Chih-Hsiang Ho, Andover, MA (US)

(73) Assignee: E Ink Corporatior, Billerica, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/745,473

(22) Filed: Jan. 17, 2020

(65) Prior Publication Data

US 2020/0152137 A1    May 14, 2020

Related U.S. Application Data

(63) Continuation of application No. 15/992,363, filed on May 30, 2018, now Pat. No. 10,573,257.
(Continued)

(51) Int. Cl.
*G09G 3/34* (2006.01)
*G02F 1/1368* (2006.01)
*G02F 1/16766* (2019.01)

(52) U.S. Cl.
CPC .......... *G09G 3/344* (2013.01); *G02F 1/1368* (2013.01); *G02F 1/16766* (2019.01);
(Continued)

(58) Field of Classification Search
CPC ...... G02F 1/1368; G02F 1/167; G02F 1/1676; G02F 1/16766; G02F 2201/121;
(Continued)

(56) References Cited

U.S. PATENT DOCUMENTS 3,383,993 A    5/1968 Yeh
4,418,346 A    11/1983 Batchelder
(Continued)

FOREIGN PATENT DOCUMENTS

JP    2011014068 A    1/2011
WO    1999067678 A2   12/1999
(Continued)

OTHER PUBLICATIONS

Wood, D., "An Electrochromic Renaissance?" Information Display, 18(3), 24 (Mar. 2002).
(Continued)

*Primary Examiner* — Dmitriy Bolotin
(74) *Attorney, Agent, or Firm* — William John Keyes

(57) ABSTRACT

A thin film transistor (TFT) backplane comprising a plurality of electrodes. Each of the plurality of electrodes is coupled to circuitry comprising: a first thin film transistor (TFT) coupled to the electrode for transmitting waveforms to the electrode, and a second TFT coupled to the electrode for discharging remnant charges from the electrode, wherein the second TFT is activated subsequent to the first TFT being deactivated.

8 Claims, 8 Drawing Sheets

Related U.S. Application Data

(60) Provisional application No. 62/512,212, filed on May 30, 2017.

(52) U.S. Cl.
CPC .. *G02F 2201/121* (2013.01); *G02F 2201/123* (2013.01); *G09G 2300/0809* (2013.01); *G09G 2300/0819* (2013.01); *G09G 2300/0842* (2013.01); *G09G 2310/0248* (2013.01); *G09G 2310/0251* (2013.01); *G09G 2310/06* (2013.01); *G09G 2310/068* (2013.01); *G09G 2320/0204* (2013.01); *G09G 2320/0223* (2013.01); *G09G 2320/0242* (2013.01); *G09G 2320/0257* (2013.01)

(58) Field of Classification Search
CPC ...... G02F 2201/123; G09G 2300/0809; G09G 2300/0819; G09G 2300/0842; G09G 2310/0248; G09G 2310/0251; G09G 2310/06; G09G 2310/068; G09G 2320/0204; G09G 2320/0223; G09G 2320/0242; G09G 2320/0257; G09G 3/344
See application file for complete search history.

(56) References Cited

U.S. PATENT DOCUMENTS

| | | |
|---|---|---|
| 5,760,761 A | 6/1998 | Sheridon |
| 5,777,782 A | 7/1998 | Sheridon |
| 5,808,783 A | 9/1998 | Crowley |
| 5,872,552 A | 2/1999 | Gordon, II |
| 5,930,026 A | 7/1999 | Jacobson |
| 6,017,584 A | 1/2000 | Albert |
| 6,054,071 A | 4/2000 | Mikkelsen, Jr. |
| 6,055,091 A | 4/2000 | Sheridon |
| 6,097,531 A | 8/2000 | Sheridon |
| 6,124,851 A | 9/2000 | Jacobson |
| 6,128,124 A | 10/2000 | Silverman |
| 6,130,773 A | 10/2000 | Jacobson |
| 6,130,774 A | 10/2000 | Albert |
| 6,137,467 A | 10/2000 | Sheridon |
| 6,144,361 A | 11/2000 | Gordon, II |
| 6,147,791 A | 11/2000 | Sheridon |
| 6,172,798 B1 | 1/2001 | Albert |
| 6,177,921 B1 | 1/2001 | Comiskey |
| 6,184,856 B1 | 2/2001 | Gordon, II |
| 6,225,971 B1 | 5/2001 | Gordon, II |
| 6,232,950 B1 | 5/2001 | Albert |
| 6,241,921 B1 | 6/2001 | Jacobson |
| 6,249,271 B1 | 6/2001 | Albert |
| 6,252,564 B1 | 6/2001 | Albert |
| 6,271,823 B1 | 8/2001 | Gordon, II |
| 6,301,038 B1 | 10/2001 | Fitzmaurice |
| 6,312,304 B1 | 11/2001 | Duthaler |
| 6,312,971 B1 | 11/2001 | Amundson |
| 6,376,828 B1 | 4/2002 | Comiskey |
| 6,392,786 B1 | 5/2002 | Albert |
| 6,413,790 B1 | 7/2002 | Duthaler |
| 6,422,687 B1 | 7/2002 | Jacobson |
| 6,445,374 B2 | 9/2002 | Albert |
| 6,445,489 B1 | 9/2002 | Jacobson |
| 6,480,182 B2 | 11/2002 | Turner |
| 6,493,396 B1 | 12/2002 | Nguyen |
| 6,498,114 B1 | 12/2002 | Amundson |
| 6,504,524 B1 | 1/2003 | Gates |
| 6,506,438 B2 | 1/2003 | Duthaler |
| 6,512,354 B2 | 1/2003 | Jacobson |
| 6,518,949 B2 | 2/2003 | Drzaic |
| 6,521,489 B2 | 2/2003 | Duthaler et al. |
| 6,531,997 B1 | 3/2003 | Gates |
| 6,535,197 B1 | 3/2003 | Comiskey |
| 6,545,291 B1 | 4/2003 | Amundson |
| 6,639,578 B1 | 10/2003 | Comiskey |
| 6,657,772 B2 | 12/2003 | Loxley |
| 6,664,944 B1 | 12/2003 | Albert |
| D485,294 S | 1/2004 | Albert |
| 6,672,921 B1 | 1/2004 | Liang |
| 6,680,725 B1 | 1/2004 | Jacobson |
| 6,683,333 B2 | 1/2004 | Kazlas |
| 6,704,133 B2 | 3/2004 | Gates |
| 6,724,519 B1 | 4/2004 | Comiskey |
| 6,750,473 B2 | 6/2004 | Amundson |
| 6,753,999 B2 | 6/2004 | Zehner |
| 6,788,449 B2 | 9/2004 | Liang |
| 6,816,147 B2 | 11/2004 | Albert |
| 6,819,471 B2 | 11/2004 | Amundson |
| 6,825,068 B2 | 11/2004 | Denis |
| 6,825,970 B2 | 11/2004 | Goenaga |
| 6,831,769 B2 | 12/2004 | Holman |
| 6,842,167 B2 | 1/2005 | Albert |
| 6,842,279 B2 | 1/2005 | Amundson |
| 6,842,657 B1 | 1/2005 | Drzaic |
| 6,864,875 B2 | 3/2005 | Drzaic |
| 6,865,010 B2 | 3/2005 | Duthaler et al. |
| 6,866,760 B2 | 3/2005 | Paolini, Jr. |
| 6,870,657 B1 | 3/2005 | Fitzmaurice |
| 6,873,452 B2 | 3/2005 | Tseng |
| 6,900,851 B2 | 5/2005 | Morrison |
| 6,909,532 B2 | 6/2005 | Chung |
| 6,922,276 B2 | 7/2005 | Zhang |
| 6,950,220 B2 | 9/2005 | Abramson et al. |
| 6,967,640 B2 | 11/2005 | Albert et al. |
| 6,980,196 B1 | 12/2005 | Turner et al. |
| 6,982,178 B2 | 1/2006 | LeCain et al. |
| 6,995,550 B2 | 2/2006 | Jacobson |
| 7,002,728 B2 | 2/2006 | Pullen |
| 7,012,600 B2 | 3/2006 | Zehner |
| 7,012,735 B2 | 3/2006 | Honeyman |
| 7,023,420 B2 | 4/2006 | Comiskey |
| 7,030,412 B1 | 4/2006 | Drzaic et al. |
| 7,034,783 B2 | 4/2006 | Gates |
| 7,061,166 B2 | 6/2006 | Kuniyasu |
| 7,061,662 B2 | 6/2006 | Chung |
| 7,072,095 B2 | 7/2006 | Liang |
| 7,075,502 B1 | 7/2006 | Drzaic |
| 7,075,703 B2 | 7/2006 | O'Neil et al. |
| 7,106,296 B1 | 9/2006 | Jacobson |
| 7,110,163 B2 | 9/2006 | Webber et al. |
| 7,116,318 B2 | 10/2006 | Amundson |
| 7,116,466 B2 | 10/2006 | Whitesides |
| 7,119,772 B2 | 10/2006 | Amundson |
| 7,144,942 B2 | 12/2006 | Zang |
| 7,148,128 B2 | 12/2006 | Jacobson |
| 7,167,155 B1 | 1/2007 | Albert |
| 7,170,670 B2 | 1/2007 | Webber |
| 7,173,752 B2 | 2/2007 | Doshi et al. |
| 7,176,880 B2 | 2/2007 | Amundson et al. |
| 7,177,066 B2 | 2/2007 | Chung |
| 7,190,008 B2 | 3/2007 | Amundson et al. |
| 7,193,625 B2 | 3/2007 | Danner |
| 7,202,847 B2 | 4/2007 | Gates |
| 7,206,119 B2 | 4/2007 | Honeyman |
| 7,223,672 B2 | 5/2007 | Kazlas et al. |
| 7,230,751 B2 | 6/2007 | Whitesides |
| 7,236,291 B2 | 6/2007 | Kaga et al. |
| 7,242,514 B2 | 7/2007 | Chung |
| 7,256,766 B2 | 8/2007 | Albert et al. |
| 7,259,744 B2 | 8/2007 | Arango |
| 7,280,094 B2 | 10/2007 | Albert |
| 7,301,693 B2 | 11/2007 | Chaug |
| 7,304,780 B2 | 12/2007 | Liu |
| 7,304,787 B2 | 12/2007 | Whitesides |
| 7,312,784 B2 | 12/2007 | Baucom |
| 7,312,794 B2 | 12/2007 | Zehner |
| 7,321,459 B2 | 1/2008 | Masuda |
| 7,327,346 B2 | 2/2008 | Chung |
| 7,327,511 B2 | 2/2008 | Whitesides |
| 7,339,715 B2 | 3/2008 | Webber |
| 7,347,957 B2 | 3/2008 | Wu |
| 7,349,148 B2 | 3/2008 | Doshi et al. |
| 7,352,353 B2 | 4/2008 | Albert |

(56) References Cited

U.S. PATENT DOCUMENTS

| | | | |
|---|---|---|---|
| 7,365,394 B2 | 4/2008 | Denis et al. |
| 7,365,733 B2 | 4/2008 | Duthaler |
| 7,382,363 B2 | 6/2008 | Albert et al. |
| 7,388,572 B2 | 6/2008 | Duthaler et al. |
| 7,401,758 B2 | 7/2008 | Liang |
| 7,408,699 B2 | 8/2008 | Wang |
| 7,411,719 B2 | 8/2008 | Paolini, Jr. |
| 7,420,549 B2 | 9/2008 | Jacobson |
| 7,442,587 B2 | 10/2008 | Amundson et al. |
| 7,453,445 B2 | 11/2008 | Amundson |
| 7,492,339 B2 | 2/2009 | Amundson |
| 7,492,497 B2 | 2/2009 | Paolini, Jr. |
| 7,528,822 B2 | 5/2009 | Amundson |
| 7,535,624 B2 | 5/2009 | Amundson et al. |
| 7,545,358 B2 | 6/2009 | Gates |
| 7,551,346 B2 | 6/2009 | Fazel |
| 7,554,712 B2 | 6/2009 | Patry et al. |
| 7,560,004 B2 | 7/2009 | Pereira |
| 7,561,324 B2 | 7/2009 | Duthaler et al. |
| 7,583,251 B2 | 9/2009 | Arango |
| 7,583,427 B2 | 9/2009 | Danner |
| 7,598,173 B2 | 10/2009 | Ritenour |
| 7,602,374 B2 | 10/2009 | Zehner |
| 7,605,799 B2 | 10/2009 | Amundson et al. |
| 7,612,760 B2 | 11/2009 | Kawai |
| 7,636,191 B2 | 12/2009 | Duthaler |
| 7,649,674 B2 | 1/2010 | Danner |
| 7,667,684 B2 | 2/2010 | Jacobson |
| 7,667,886 B2 | 2/2010 | Danner |
| 7,672,040 B2 | 3/2010 | Sohn |
| 7,679,599 B2 | 3/2010 | Kawai |
| 7,679,813 B2 | 3/2010 | Liang |
| 7,679,814 B2 | 3/2010 | Paolini, Jr. |
| 7,683,606 B2 | 3/2010 | Kang |
| 7,688,297 B2 | 3/2010 | Zehner |
| 7,688,497 B2 | 3/2010 | Danner |
| 7,715,088 B2 | 5/2010 | Liang |
| 7,729,039 B2 | 6/2010 | LeCain et al. |
| 7,733,311 B2 | 6/2010 | Amundson |
| 7,733,335 B2 | 6/2010 | Zehner |
| 7,785,988 B2 | 8/2010 | Amundson |
| 7,787,169 B2 | 8/2010 | Abramson et al. |
| 7,791,789 B2 | 9/2010 | Albert |
| 7,830,592 B1 | 11/2010 | Sprague |
| 7,839,564 B2 | 11/2010 | Whitesides et al. |
| 7,843,626 B2 | 11/2010 | Amundson et al. |
| 7,859,637 B2 | 12/2010 | Amundson et al. |
| 7,859,742 B1 | 12/2010 | Chiu |
| 7,880,958 B2 | 2/2011 | Zang |
| 7,893,435 B2 | 2/2011 | Kazlas et al. |
| 7,898,717 B2 | 3/2011 | Patry |
| 7,905,977 B2 | 3/2011 | Qi |
| 7,910,175 B2 | 3/2011 | Webber |
| 7,952,557 B2 | 5/2011 | Amundson |
| 7,952,790 B2 | 5/2011 | Honeyman et al. |
| 7,956,841 B2 | 6/2011 | Albert |
| 7,957,053 B2 | 6/2011 | Honeyman |
| 7,982,479 B2 | 7/2011 | Wang |
| 7,986,450 B2 | 7/2011 | Cao |
| 7,999,787 B2 | 8/2011 | Amundson |
| 8,009,344 B2 | 8/2011 | Danner |
| 8,009,348 B2 | 8/2011 | Zehner |
| 8,027,081 B2 | 9/2011 | Danner |
| 8,040,594 B2 | 10/2011 | Paolini, Jr. |
| 8,049,947 B2 | 11/2011 | Danner |
| 8,054,526 B2 | 11/2011 | Bouchard |
| 8,072,675 B2 | 12/2011 | Lin |
| 8,077,141 B2 | 12/2011 | Duthaler |
| 8,089,453 B2 | 1/2012 | Comiskey |
| 8,098,418 B2 | 1/2012 | Paolini, Jr. |
| 8,120,836 B2 | 2/2012 | Lin |
| 8,125,501 B2 | 2/2012 | Amundson |
| 8,139,050 B2 | 3/2012 | Jacobson |
| 8,159,636 B2 | 4/2012 | Sun |
| 8,174,490 B2 | 5/2012 | Whitesides |
| 8,208,193 B2 | 6/2012 | Patry |
| 8,213,076 B2 | 7/2012 | Albert |
| 8,237,892 B1 | 8/2012 | Sprague |
| 8,238,021 B2 | 8/2012 | Sprague |
| 8,243,013 B1 | 8/2012 | Sprague |
| 8,274,472 B1 | 9/2012 | Wang |
| 8,289,250 B2 | 10/2012 | Zehner |
| 8,300,006 B2 | 10/2012 | Zhou |
| 8,305,341 B2 | 11/2012 | Arango |
| 8,314,784 B2 | 11/2012 | Ohkami |
| 8,319,759 B2 | 11/2012 | Jacobson |
| 8,362,488 B2 | 1/2013 | Chaug |
| 8,363,299 B2 | 1/2013 | Paolini, Jr. |
| 8,373,211 B2 | 2/2013 | Amundson |
| 8,373,649 B2 | 2/2013 | Low |
| 8,384,658 B2 | 2/2013 | Albert |
| 8,389,381 B2 | 3/2013 | Amundson |
| 8,395,836 B2 | 3/2013 | Lin |
| 8,431,941 B2 | 4/2013 | Aoki et al. |
| 8,437,069 B2 | 5/2013 | Lin |
| 8,441,414 B2 | 5/2013 | Lin |
| 8,441,714 B2 | 5/2013 | Paolini, Jr. |
| 8,441,716 B2 | 5/2013 | Paolini, Jr. |
| 8,456,414 B2 | 6/2013 | Lin |
| 8,456,589 B1 | 6/2013 | Sprague |
| 8,462,102 B2 | 6/2013 | Wong |
| 8,466,852 B2 | 6/2013 | Drzaic |
| 8,498,042 B2 | 7/2013 | Danner |
| 8,514,168 B2 | 8/2013 | Chung |
| 8,537,105 B2 | 9/2013 | Chiu |
| 8,547,628 B2 | 10/2013 | Wu |
| 8,558,783 B2 | 10/2013 | Wilcox |
| 8,558,785 B2 | 10/2013 | Zehner |
| 8,558,786 B2 | 10/2013 | Lin |
| 8,558,855 B2 | 10/2013 | Sprague |
| 8,576,162 B2 | 11/2013 | Kang |
| 8,576,164 B2 | 11/2013 | Sprague |
| 8,576,259 B2 | 11/2013 | Lin |
| 8,576,470 B2 | 11/2013 | Paolini, Jr. |
| 8,576,476 B2 | 11/2013 | Telfer |
| 8,593,396 B2 | 11/2013 | Amundson |
| 8,593,721 B2 | 11/2013 | Albert |
| 8,605,032 B2 | 12/2013 | Liu |
| 8,610,988 B2 | 12/2013 | Zehner |
| 8,624,834 B2 | 1/2014 | Kim |
| 8,643,595 B2 | 2/2014 | Chung |
| 8,665,206 B2 | 3/2014 | Lin |
| 8,681,191 B2 | 3/2014 | Yang |
| 8,692,752 B2 | 4/2014 | Chang et al. |
| 8,714,780 B2 | 5/2014 | Ho |
| 8,728,266 B2 | 5/2014 | Danner |
| 8,730,153 B2 | 5/2014 | Sprague |
| 8,743,077 B1 | 6/2014 | Sprague |
| 8,754,859 B2 | 6/2014 | Gates |
| 8,773,398 B2 | 7/2014 | Funo et al. |
| 8,797,258 B2 | 8/2014 | Sprague |
| 8,797,633 B1 | 8/2014 | Sprague |
| 8,797,634 B2 | 8/2014 | Paolini, Jr. |
| 8,797,636 B2 | 8/2014 | Yang |
| 8,810,525 B2 | 8/2014 | Sprague |
| 8,830,559 B2 | 9/2014 | Honeyman |
| 8,830,560 B2 | 9/2014 | Danner |
| 8,873,129 B2 | 10/2014 | Paolini, Jr. |
| 8,891,155 B2 | 11/2014 | Danner |
| 8,902,153 B2 | 12/2014 | Bouchard |
| 8,928,562 B2 | 1/2015 | Gates |
| 8,928,575 B2 | 1/2015 | Moriya et al. |
| 8,928,641 B2 | 1/2015 | Chiu |
| 8,969,886 B2 | 3/2015 | Amundson |
| 8,976,444 B2 | 3/2015 | Zhang |
| 8,982,115 B2 | 3/2015 | Sung et al. |
| 9,001,026 B2 | 4/2015 | Hsu |
| 9,013,394 B2 | 4/2015 | Lin |
| 9,019,197 B2 | 4/2015 | Lin |
| 9,019,198 B2 | 4/2015 | Lin |
| 9,019,318 B2 | 4/2015 | Sprague |
| 9,025,234 B2 | 5/2015 | Lin |
| 9,025,238 B2 | 5/2015 | Chan |
| 9,030,374 B2 | 5/2015 | Sprague |

(56) References Cited

U.S. PATENT DOCUMENTS

| | | |
|---|---|---|
| 9,082,352 B2 | 7/2015 | Cheng |
| 9,140,952 B2 | 9/2015 | Sprague |
| 9,147,364 B2 | 9/2015 | Wu |
| 9,152,003 B2 | 10/2015 | Danner |
| 9,152,004 B2 | 10/2015 | Paolini, Jr. |
| 9,170,467 B2 | 10/2015 | Whitesides |
| 9,171,508 B2 | 10/2015 | Sprague |
| 9,185,329 B2 | 11/2015 | Kim |
| 9,199,441 B2 | 12/2015 | Danner |
| 9,201,279 B2 | 12/2015 | Wu |
| 9,218,773 B2 | 12/2015 | Sun |
| 9,223,164 B2 | 12/2015 | Lai |
| 9,224,338 B2 | 12/2015 | Chan |
| 9,224,342 B2 | 12/2015 | Sprague |
| 9,224,344 B2 | 12/2015 | Chung |
| 9,230,492 B2 | 1/2016 | Harrington |
| 9,251,736 B2 | 2/2016 | Lin |
| 9,262,973 B2 | 2/2016 | Wu |
| 9,269,311 B2 | 2/2016 | Amundson |
| 9,279,906 B2 | 3/2016 | Kang |
| 9,285,648 B2 | 3/2016 | Liu |
| 9,293,511 B2 | 3/2016 | Jacobson |
| 9,299,294 B2 | 3/2016 | Lin |
| 9,310,661 B2 | 4/2016 | Wu |
| 9,373,289 B2 | 6/2016 | Sprague |
| 9,390,066 B2 | 7/2016 | Smith |
| 9,390,661 B2 | 7/2016 | Chiu |
| 9,412,314 B2 | 8/2016 | Amundson |
| 9,419,024 B2 | 8/2016 | Amundson |
| 9,454,057 B2 | 9/2016 | Wu |
| 9,460,666 B2 | 10/2016 | Sprague |
| 9,495,918 B2 | 11/2016 | Harrington |
| 9,501,981 B2 | 11/2016 | Lin |
| 9,513,743 B2 | 12/2016 | Sjodin et al. |
| 9,514,667 B2 | 12/2016 | Lin |
| 9,529,240 B2 | 12/2016 | Paolini, Jr. |
| 9,542,895 B2 | 1/2017 | Gates |
| 9,548,035 B2 | 1/2017 | Chen et al. |
| 9,564,088 B2 | 2/2017 | Wilcox et al. |
| 9,582,041 B2 | 2/2017 | Cheng |
| 9,607,580 B2 | 3/2017 | Kim et al. |
| 9,612,502 B2 | 4/2017 | Danner |
| 9,620,048 B2 | 4/2017 | Sim |
| 9,620,066 B2 | 4/2017 | Bishop |
| 9,620,067 B2 | 4/2017 | Harrington |
| 9,632,373 B2 | 4/2017 | Huang |
| 9,666,142 B2 | 5/2017 | Hung |
| 9,671,635 B2 | 6/2017 | Paolini, Jr. |
| 9,672,766 B2 | 6/2017 | Sjodin |
| 9,691,333 B2 | 6/2017 | Cheng |
| 9,721,495 B2 | 8/2017 | Harrington |
| 9,778,500 B2 | 10/2017 | Gates |
| 9,792,861 B2 | 10/2017 | Chang |
| 9,792,862 B2 | 10/2017 | Hung |
| 9,841,653 B2 | 12/2017 | Wu |
| 9,966,018 B2 | 5/2018 | Gates |
| 10,037,735 B2 | 7/2018 | Amundson |
| 10,048,563 B2 | 8/2018 | Paolini, Jr. |
| 10,048,564 B2 | 8/2018 | Paolini, Jr. |
| 10,163,406 B2 | 12/2018 | Sim et al. |
| 10,190,743 B2 | 1/2019 | Hertel et al. |
| 10,229,641 B2 | 3/2019 | Yang |
| 10,319,313 B2 | 6/2019 | Harris |
| 10,475,396 B2 | 11/2019 | Sim et al. |
| 10,573,257 B2 * | 2/2020 | Emelie .................. G09G 3/344 |
| 2002/0060321 A1 | 5/2002 | Kazlas |
| 2003/0102858 A1 | 6/2003 | Jacobson |
| 2004/0085619 A1 | 5/2004 | Wu |
| 2004/0105036 A1 | 6/2004 | Danner et al. |
| 2004/0246562 A1 | 12/2004 | Chung |
| 2005/0122306 A1 | 6/2005 | Wilcox et al. |
| 2005/0122563 A1 | 6/2005 | Honeyman et al. |
| 2005/0253777 A1 | 11/2005 | Zehner |
| 2006/0255322 A1 | 11/2006 | Wu |
| 2007/0052757 A1 | 3/2007 | Jacobson |
| 2007/0091418 A1 | 4/2007 | Danner |
| 2007/0103427 A1 | 5/2007 | Zhou et al. |
| 2007/0176912 A1 | 8/2007 | Beames |
| 2008/0024429 A1 | 1/2008 | Zehner |
| 2008/0024482 A1 | 1/2008 | Gates |
| 2008/0043318 A1 | 2/2008 | Whitesides |
| 2008/0048970 A1 | 2/2008 | Drzaic |
| 2008/0136774 A1 | 6/2008 | Harris |
| 2008/0303780 A1 | 12/2008 | Sprague |
| 2009/0122389 A1 | 5/2009 | Whitesides |
| 2009/0174651 A1 | 7/2009 | Jacobson |
| 2009/0225398 A1 | 9/2009 | Duthaler |
| 2009/0295710 A1 | 12/2009 | Shimodaira |
| 2009/0315044 A1 | 12/2009 | Amundson |
| 2009/0322721 A1 | 12/2009 | Zehner |
| 2010/0073282 A1 | 3/2010 | Murayama |
| 2010/0156780 A1 | 6/2010 | Jacobson |
| 2010/0177396 A1 | 7/2010 | Lin |
| 2010/0194733 A1 | 8/2010 | Lin |
| 2010/0194789 A1 | 8/2010 | Lin |
| 2010/0220121 A1 | 9/2010 | Zehner |
| 2010/0265561 A1 | 10/2010 | Gates et al. |
| 2011/0063314 A1 | 3/2011 | Chiu |
| 2011/0140744 A1 | 6/2011 | Kazlas |
| 2011/0175875 A1 | 7/2011 | Lin |
| 2011/0187683 A1 | 8/2011 | Wilcox |
| 2011/0193840 A1 | 8/2011 | Amundson |
| 2011/0193841 A1 | 8/2011 | Amundson |
| 2011/0199671 A1 | 8/2011 | Amundson |
| 2011/0221740 A1 | 9/2011 | Yang |
| 2011/0292319 A1 | 12/2011 | Cole |
| 2012/0001957 A1 | 1/2012 | Liu |
| 2012/0098740 A1 | 4/2012 | Chiu |
| 2012/0293858 A1 | 11/2012 | Telfer |
| 2012/0326957 A1 | 12/2012 | Drzaic |
| 2013/0063333 A1 | 3/2013 | Arango |
| 2013/0096486 A1 | 4/2013 | Schroeder |
| 2013/0194250 A1 | 8/2013 | Amundson |
| 2013/0249782 A1 | 9/2013 | Wu |
| 2014/0009817 A1 | 1/2014 | Wilcox et al. |
| 2014/0078024 A1 | 3/2014 | Paolini, Jr. |
| 2014/0192000 A1 | 7/2014 | Hung |
| 2014/0204012 A1 | 7/2014 | Wu |
| 2014/0210701 A1 | 7/2014 | Wu |
| 2014/0240210 A1 | 8/2014 | Wu |
| 2014/0253425 A1 | 9/2014 | Zalesky |
| 2014/0293398 A1 | 10/2014 | Wang |
| 2015/0097877 A1 | 4/2015 | Lin |
| 2015/0261057 A1 | 9/2015 | Harris |
| 2015/0262255 A1 | 9/2015 | Khajehnouri |
| 2015/0378235 A1 | 12/2015 | Lin |
| 2016/0077375 A1 | 3/2016 | Lin |
| 2016/0103380 A1 | 4/2016 | Kayal |
| 2016/0140910 A1 | 5/2016 | Amundson |
| 2016/0180777 A1 | 6/2016 | Lin |
| 2017/0076672 A1 | 3/2017 | Crounse |
| 2017/0092183 A1 | 3/2017 | Pappas et al. |

FOREIGN PATENT DOCUMENTS

| | | |
|---|---|---|
| WO | 2000005704 A1 | 2/2000 |
| WO | 2000038000 A1 | 6/2000 |

OTHER PUBLICATIONS

O'Regan, B. et al., "A Low Cost, High-efficiency Solar Cell Based on Dye-sensitized colloidal TiO2 Films", Nature, vol. 353, pp. 737-740 (Oct. 24, 1991).

Bach, Udo. et al., "Nanomaterials-Based Electrochromics for Paper-Quality Displays", Adv. Mater, vol. 14, No. 11, pp. 845-848, (Jun. 5, 2002).

Hayes, R.A. et al., "Video-Speed Electronic Paper Based on Electrowetting", Nature, vol. 425, No. 25, pp. 383-385 (Sep. 2003).

Kitamura, T. et al., "Electrical toner movement for electronic paper-like display", Asia Display/IDW '01, pp. 1517-1520, Paper HCS1-1 (2001).

(56) References Cited

OTHER PUBLICATIONS

Yamaguchi, Y. et al., "Toner display using insulative particles charged triboelectrically", Asia Display/IDW '01, pp. 1729-1730, Paper AMD4-4 (2001). 1.
Powell, M.J., "The physics of amorphous-silicon thin-film transistors", IEEE Tran. Elec. Dev., 36, 2753 (1989).
Korean Intellectual Property Office, PCT/US2018/035005, International Search Report and Written Opinion, dated Sep. 27, 2018.

\* cited by examiner

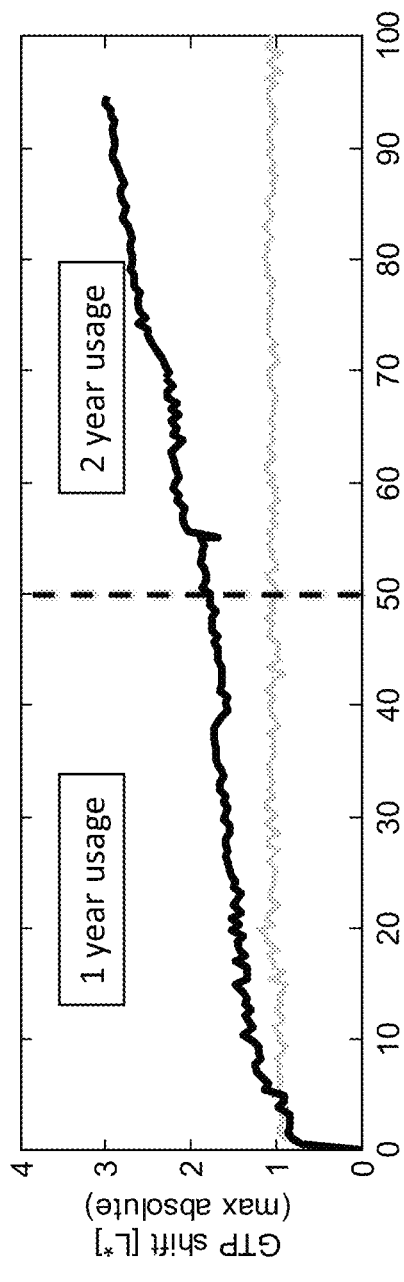
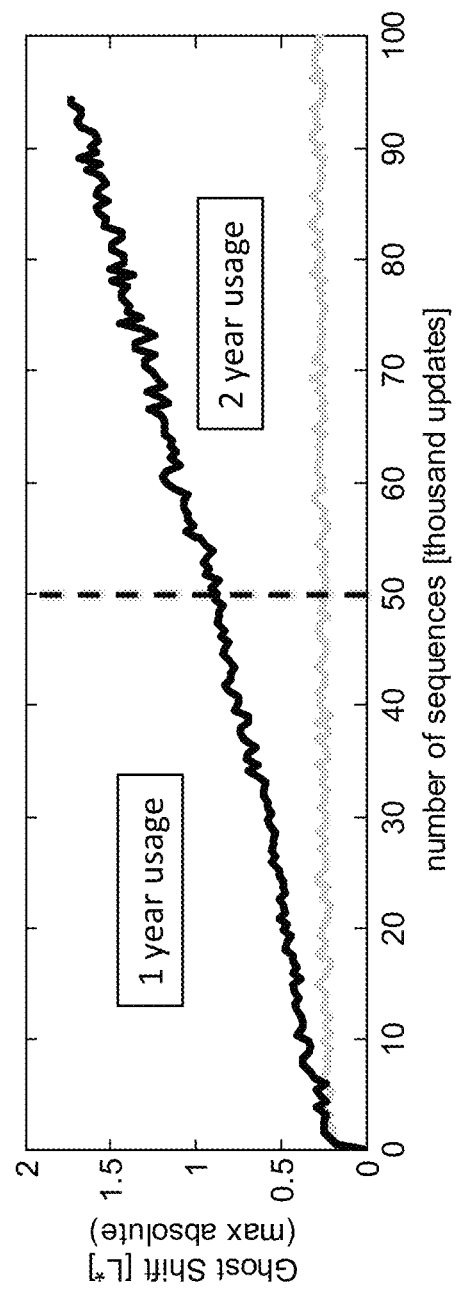
FIG 2A
FIG 2B

ELECTRO-OPTIC DISPLAYS

REFERENCE TO RELATED APPLICATIONS

This application claims priority to U.S. patent application Ser. No. 15/992,363 filed on May 30, 2018 and claiming priority to U.S. Patent Application No. 62/512,212 filed on May 30, 2017. This application is also related to U.S. patent application Ser. No. 15/015,822 filed on Feb. 4, 2016 (Publication No. 2016/0225322); U.S. patent application Ser. No. 15/014,236 filed on Feb. 3, 2016 (Publication No. 2016/0225321); and U.S. patent application Ser. No. 15/266,554 filed on Sep. 15, 2016 (Publication No. 2017/0076672).

All of the above-listed applications are incorporated by reference in their entireties.

SUBJECT OF THE INVENTION

The subject matter disclosed herein relates to means and methods to drive electro-optic displays. Specifically, the subject matter is related to backplane designs for electro-optic displays and methods for driving and/or discharging such displays.

BACKGROUND

Electrophoretic displays or EPDs are commonly driven by so-called DC-balanced waveforms. DC-balanced waveforms have been proven to improve long-term usage of EPDs by reducing severe hardware degradations and eliminating other reliability issues. However, the DC-balance waveform constraint limits the set of possible waveforms that are available to drive the EPD display, making it difficult or sometimes impossible to implement advantageous features via a waveform mode. For example, when implementing a "flash-less" white-on-black display mode, excessive white edge accumulation may become visible when graytones that have transitioned to black are next to a non-flashing black background. To clear such edges, a DC-imbalanced drive scheme may have worked well, but such drive scheme requires breaking the DC-balance constraint. However, DC-imbalanced drive schemes or waveforms can cause hardware degradations over time which shortens display devices' lifetime. As such, there exists a need to design electro-optic displays capable of operating with DC-imbalanced waveforms or drive schemes without suffering hardware degradations.

SUMMARY

According to one embodiment of the subject matter presented herein, an electro-optic display may comprise an electrophoretic material configured for displaying images, and an active component coupled to the electrophoretic material for discharging charges within the electrophoretic material.

In another embodiment in accordance with the subject matter disclosed herein, an electro-optic display may comprise an electrophoretic material configured for displaying images, and a passive component coupled to the electrophoretic material for discharging charges within the electrophoretic material.

In yet another embodiment, a method for discharging remnant voltage from an electro-optic display, where the electro-optic display may have an electrophoretic material configured to display images, the electrophoretic material positioned between a pixel electrode and a common electrode, a thin-film-transistor (TFT) coupled to the electrophoretic material and configured for discharging charges from the electrophoretic material, and a select line coupled to the TFT to activate the TFT, the method may comprise supplying a voltage through the select line to activate the TFT to create a conductive path to the electrophoretic material through the TFT, and discharging the charges within the electrophoretic material through the conductive path.

BRIEF DESCRIPTION OF DRAWINGS

FIGS. 2A and 2B are graphs illustrating graytone and ghosting shifts of a display due to shifts in TFT performance;

DETAILED DESCRIPTION

Figure 1:
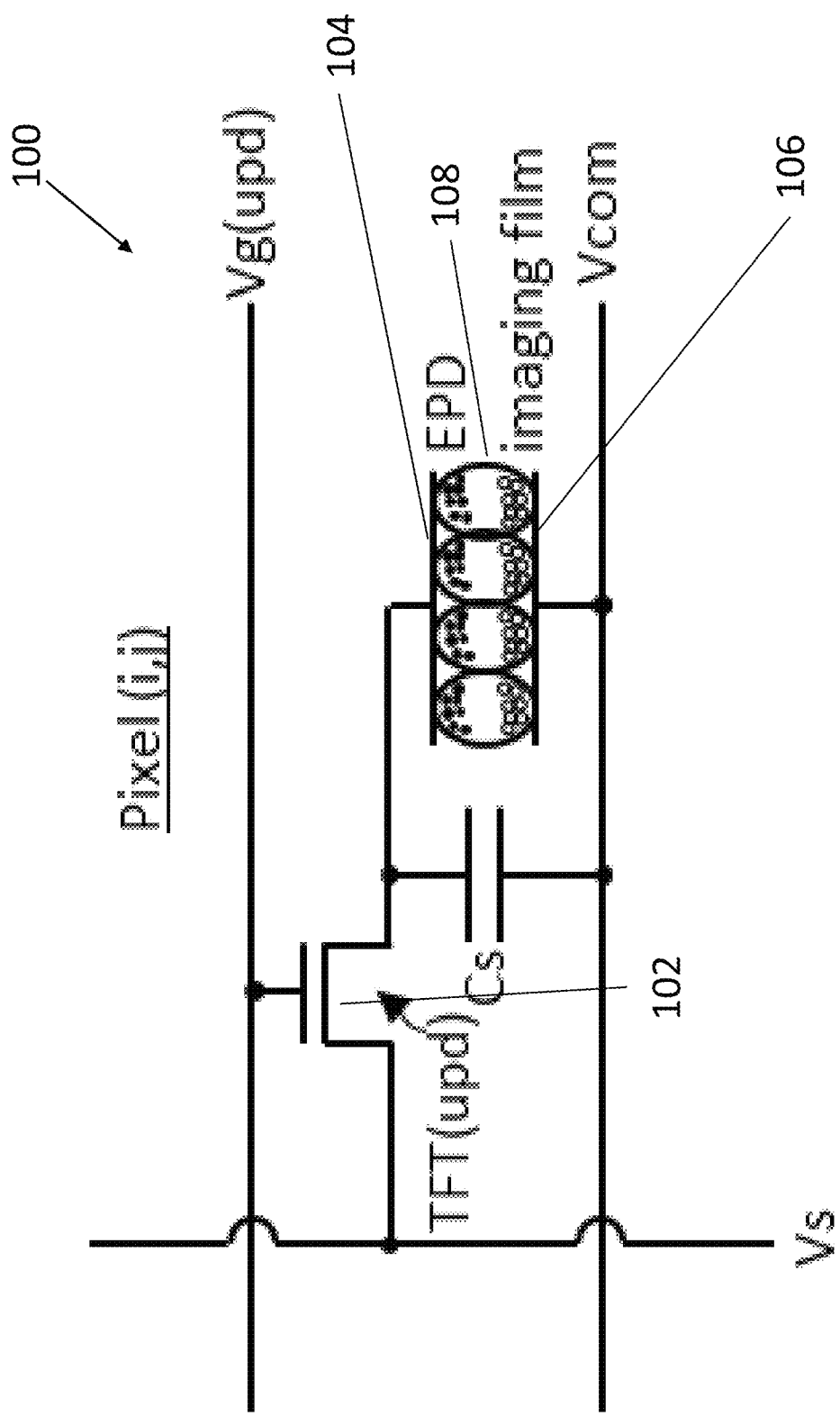
FIG. 1 is one embodiment of an equivalent circuit of a display pixel in accordance with the subject matter presented herein.

The subject matter disclosed herein relates to improving electro-optic display durabilities. Specifically, it is related to improving optical performance shifts such as mitigating gray-tone shifts and ghosting shifts caused by component stresses.

The term "electro-optic", as applied to a material or a display, is used herein in its conventional meaning in the imaging art to refer to a material having first and second display states differing in at least one optical property, the material being changed from its first to its second display state by application of an electric field to the material. Although the optical property is typically color perceptible to the human eye, it may be another optical property, such as optical transmission, reflectance, luminescence or, in the case of displays intended for machine reading, pseudo-color in the sense of a change in reflectance of electromagnetic wavelengths outside the visible range.

The terms "bistable" and "bistability" are used herein in their conventional meaning in the art to refer to displays comprising display elements having first and second display states differing in at least one optical property, and such that after any given element has been driven, by means of an addressing pulse of finite duration, to assume either its first or second display state, after the addressing pulse has terminated, that state will persist for at least several times, for example at least four times, the minimum duration of the addressing pulse required to change the state of the display element. It is shown in U.S. Pat. No. 7,170,670 that some particle-based electrophoretic displays capable of gray scale are stable not only in their extreme black and white states but also in their intermediate gray states, and the same is true of some other types of electro-optic displays. This type of display is properly called "multi-stable" rather than bistable, although for convenience the term "bistable" may be used herein to cover both bistable and multi-stable displays.

The term "gray state" is used herein in its conventional meaning in the imaging art to refer to a state intermediate two extreme optical states of a pixel, and does not necessarily imply a black-white transition between these two extreme states. For example, several of the E Ink patents and published applications referred to below describe electrophoretic displays in which the extreme states are white and deep blue, so that an intermediate "gray state" would actually be pale blue. Indeed, as already mentioned, the change in optical state may not be a color change at all. The terms "black" and "white" may be used hereinafter to refer to the two extreme optical states of a display, and should be understood as normally including extreme optical states which are not strictly black and white, for example, the aforementioned white and dark blue states. The term "monochrome" may be used hereinafter to denote a display or drive scheme which only drives pixels to their two extreme optical states with no intervening gray states.

The term "pixel" is used herein in its conventional meaning in the display art to mean the smallest unit of a display capable of generating all the colors which the display itself can show. In a full color display, typically each pixel is composed of a plurality of sub-pixels each of which can display less than all the colors which the display itself can show. For example, in most conventional full color displays, each pixel is composed of a red sub-pixel, a green sub-pixel, a blue sub-pixel, and optionally a white sub-pixel, with each of the sub-pixels being capable of displaying a range of colors from black to the brightest version of its specified color.

Several types of electro-optic displays are known. One type of electro-optic display is a rotating bichromal member type as described, for example, in U.S. Pat. Nos. 5,808,783; 5,777,782; 5,760,761; 6,054,071 6,055,091; 6,097,531; 6,128,124; 6,137,467; and 6,147,791 (although this type of display is often referred to as a "rotating bichromal ball" display, the term "rotating bichromal member" is preferred as more accurate since in some of the patents mentioned above the rotating members are not spherical). Such a display uses a large number of small bodies (typically spherical or cylindrical) which have two or more sections with differing optical characteristics, and an internal dipole. These bodies are suspended within liquid-filled vacuoles within a matrix, the vacuoles being filled with liquid so that the bodies are free to rotate. The appearance of the display is changed by applying an electric field thereto, thus rotating the bodies to various positions and varying which of the sections of the bodies is seen through a viewing surface. This type of electro-optic medium is typically bistable.

Another type of electro-optic display uses an electrochromic medium, for example an electrochromic medium in the form of a nanochromic film comprising an electrode formed at least in part from a semi-conducting metal oxide and a plurality of dye molecules capable of reversible color change attached to the electrode; see, for example O'Regan, B., et al., Nature 1991, 353, 737; and Wood, D., Information Display, 18(3), 24 (March 2002). See also Bach, U., et al., Adv. Mater., 2002, 1401), 845. Nanochromic films of this type are also described, for example, in U.S. Pat. Nos. 6,301,038; 6,870,657; and 6,950,220. This type of medium is also typically bistable.

Another type of electro-optic display is an electro-wetting display developed by Philips and described in Hayes, R A., et al., "Video-Speed Electronic Paper Based on Electrowetting", Nature, 425, 383-385 (2003). It is shown in U.S. Pat. No. 7,420,549 that such electro-wetting displays can be made bistable.

One type of electro-optic display, which has been the subject of intense research and development for a number of years, is the particle-based electrophoretic display, in which a plurality of charged particles move through a fluid under the influence of an electric field. Electrophoretic displays can have attributes of good brightness and contrast, wide viewing angles, state bistability, and low power consumption when compared with liquid crystal displays.

As noted above, electrophoretic media require the presence of a fluid. In most prior art electrophoretic media, this fluid is a liquid, but electrophoretic media can be produced using gaseous fluids; see, for example, Kitamura, T., et al., "Electrical toner movement for electronic paper-like display", IDW Japan, 2001, Paper HCS1-1, and Yamaguchi, Y., et al., "Toner display using insulative particles charged triboelectrically", IDW Japan, 2001, Paper AMD4-4). See also U.S. Pat. Nos. 7,321,459 and 7,236,291. Such gas-based electrophoretic media appear to be susceptible to the same types of problems due to particle settling as liquid-based electrophoretic media, when the media are used in an orientation which permits such settling, for example in a sign where the medium is disposed in a vertical plane. Indeed, particle settling appears to be a more serious problem in gas-based electrophoretic media than in liquid-based ones, since the lower viscosity of gaseous suspending fluids as compared with liquid ones allows more rapid settling of the electrophoretic particles.

Numerous patents and applications assigned to or in the names of the Massachusetts Institute of Technology (MIT) and E Ink Corporation describe various technologies used in encapsulated electrophoretic and other electro-optic media. Such encapsulated media comprise numerous small capsules, each of which itself comprises an internal phase containing electrophoretically-mobile particles in a fluid medium, and a capsule wall surrounding the internal phase. Typically, the capsules are themselves held within a polymeric binder to form a coherent layer positioned between two electrodes. The technologies described in these patents and applications include:

(a) Electrophoretic particles, fluids and fluid additives; see for example U.S. Pat. Nos. 7,002,728 and 7,679,814;
(b) Capsules, binders and encapsulation processes; see for example U.S. Pat. Nos. 6,922,276 and 7,411,719;
(c) Films and sub-assemblies containing electro-optic materials; see for example U.S. Pat. Nos. 6,982,178 and 7,839,564;
(d) Backplanes, adhesive layers and other auxiliary layers and methods used in displays; see for example U.S. Pat. Nos. D485,294; 6,124,851; 6,130,773; 6,177,921; 6,232,950; 6,252,564; 6,312,304; 6,312,971; 6,376, 828; 6,392,786; 6,413,790; 6,422,687; 6,445,374; 6,480,182; 6,498,114; 6,506,438; 6,518,949; 6,521, 489; 6,535,197; 6,545,291; 6,639,578; 6,657,772; 6,664,944; 6,680,725; 6,683,333; 6,724,519; 6,750, 473; 6,816,147; 6,819,471; 6,825,068; 6,831,769; 6,842,167; 6,842,279; 6,842,657; 6,865,010; 6,873, 452; 6,909,532; 6,967,640; 6,980,196; 7,012,735; 7,030,412; 7,075,703; 7,106,296; 7,110,163; 7,116, 318; 7,148,128; 7,167,155; 7,173,752; 7,176,880; 7,190,008; 7,206,119; 7,223,672; 7,230,751; 7,256, 766; 7,259,744; 7,280,094; 7,301,693; 7,304,780;

7,327,511; 7,347,957; 7,349,148; 7,352,353; 7,365,394; 7,365,733; 7,382,363; 7,388,572; 7,401,758; 7,442,587; 7,492,497; 7,535,624; 7,551,346; 7,554,712; 7,583,427; 7,598,173; 7,605,799; 7,636,191; 7,649,674; 7,667,886; 7,672,040; 7,688,497; 7,733,335; 7,785,988; 7,830,592; 7,843,626; 7,859,637; 7,880,958; 7,893,435; 7,898,717; 7,905,977; 7,957,053; 7,986,450; 8,009,344; 8,027,081; 8,049,947; 8,072,675; 8,077,141; 8,089,453; 8,120,836; 8,159,636; 8,208,193; 8,237,892; 8,238,021; 8,362,488; 8,373,211; 8,389,381; 8,395,836; 8,437,069; 8,441,414; 8,456,589; 8,498,042; 8,514,168; 8,547,628; 8,576,162; 8,610,988; 8,714,780; 8,728,266; 8,743,077; 8,754,859; 8,797,258; 8,797,633; 8,797,636; 8,830,560; 8,891,155; 8,969,886; 9,147,364; 9,025,234; 9,025,238; 9,030,374; 9,140,952; 9,152,003; 9,152,004; 9,201,279; 9,223,164; 9,285,648; and 9,310,661; and U.S. Patent Applications Publication Nos. 2002/0060321; 2004/0008179; 2004/0085619; 2004/0105036; 2004/0112525; 2005/0122306; 2005/0122563; 2006/0215106; 2006/0255322; 2007/0052757; 2007/0097489; 2007/0109219; 2008/0061300; 2008/0149271; 2009/0122389; 2009/0315044; 2010/0177396; 2011/0140744; 2011/0187683; 2011/0187689; 2011/0292319; 2013/0250397; 2013/0278900; 2014/0078024; 2014/0139501; 2014/0192000; 2014/0210701; 2014/0300837; 2014/0368753; 2014/0376164; 2015/0171112; 2015/0205178; 2015/0226986; 2015/0227018; 2015/0228666; 2015/0261057; 2015/0356927; 2015/0378235; 2016/077375; 2016/0103380; and 2016/0187759; and International Application Publication No. WO 00/38000; European Patents Nos. 1,099,207 B1 and 1,145,072 B1;

(e) Color formation and color adjustment; see for example U.S. Pat. Nos. 6,017,584; 6,664,944; 6,864,875; 7,075,502; 7,167,155; 7,667,684; 7,791,789; 7,956,841; 8,040,594; 8,054,526; 8,098,418; 8,213,076; and 8,363,299; and U.S. Patent Applications Publication Nos. 2004/0263947; 2007/0109219; 2007/0223079; 2008/0023332; 2008/0043318; 2008/0048970; 2009/0004442; 2009/0225398; 2010/0103502; 2010/0156780; 2011/0164307; 2011/0195629; 2011/0310461; 2012/0008188; 2012/0019898; 2012/0075687; 2012/0081779; 2012/0134009; 2012/0182597; 2012/0212462; 2012/0157269; and 2012/0326957;

(f) Methods for driving displays; see for example U.S. Pat. Nos. 7,012,600 and 7,453,445;

(g) Applications of displays; see for example U.S. Pat. Nos. 7,312,784 and 8,009,348;

(h) Non-electrophoretic displays, as described in U.S. Pat. Nos. 6,241,921; 6,950,220; 7,420,549 and 8,319,759; and U.S. Patent Application Publication No. 2012/0293858;

(i) Microcell structures, wall materials, and methods of forming microcells; see for example U.S. Pat. Nos. 7,072,095 and 9,279,906; and (j) Methods for filling and sealing microcells; see for example U.S. Pat. Nos. 7,144,942 and 7,715,088.

This application is further related to U.S. Pat. Nos. D485,294; 6,124,851; 6,130,773; 6,177,921; 6,232,950; 6,252,564; 6,312,304; 6,312,971; 6,376,828; 6,392,786; 6,413,790; 6,422,687; 6,445,374; 6,480,182; 6,498,114; 6,506,438; 6,518,949; 6,521,489; 6,535,197; 6,545,291; 6,639,578; 6,657,772; 6,664,944; 6,680,725; 6,683,333; 6,724,519; 6,750,473; 6,816,147; 6,819,471; 6,825,068; 6,831,769; 6,842,167; 6,842,279; 6,842,657; 6,865,010; 6,873,452; 6,909,532; 6,967,640; 6,980,196; 7,012,735; 7,030,412; 7,075,703; 7,106,296; 7,110,163; 7,116,318; 7,148,128; 7,167,155; 7,173,752; 7,176,880; 7,190,008; 7,206,119; 7,223,672; 7,230,751; 7,256,766; 7,259,744; 7,280,094; 7,301,693; 7,304,780; 7,327,511; 7,347,957; 7,349,148; 7,352,353; 7,365,394; 7,365,733; 7,382,363; 7,388,572; 7,401,758; 7,442,587; 7,492,497; 7,535,624; 7,551,346; 7,554,712; 7,583,427; 7,598,173; 7,605,799; 7,636,191; 7,649,674; 7,667,886; 7,672,040; 7,688,497; 7,733,335; 7,785,988; 7,830,592; 7,843,626; 7,859,637; 7,880,958; 7,893,435; 7,898,717; 7,905,977; 7,957,053; 7,986,450; 8,009,344; 8,027,081; 8,049,947; 8,072,675; 8,077,141; 8,089,453; 8,120,836; 8,159,636; 8,208,193; 8,237,892; 8,238,021; 8,362,488; 8,373,211; 8,389,381; 8,395,836; 8,437,069; 8,441,414; 8,456,589; 8,498,042; 8,514,168; 8,547,628; 8,576,162; 8,610,988; 8,714,780; 8,728,266; 8,743,077; 8,754,859; 8,797,258; 8,797,633; 8,797,636; 8,830,560; 8,891,155; 8,969,886; 9,147,364; 9,025,234; 9,025,238; 9,030,374; 9,140,952; 9,152,003; 9,152,004; 9,201,279; 9,223,164; 9,285,648; and 9,310,661; and U.S. Patent Applications Publication Nos. 2002/0060321; 2004/0008179; 2004/0085619; 2004/0105036; 2004/0112525; 2005/0122306; 2005/0122563; 2006/0215106; 2006/0255322; 2007/0052757; 2007/0097489; 2007/0109219; 2008/0061300; 2008/0149271; 2009/0122389; 2009/0315044; 2010/0177396; 2011/0140744; 2011/0187683; 2011/0187689; 2011/0292319; 2013/0250397; 2013/0278900; 2014/0078024; 2014/0139501; 2014/0192000; 2014/0210701; 2014/0300837; 2014/0368753; 2014/0376164; 2015/0171112; 2015/0205178; 2015/0226986; 2015/0227018; 2015/0228666; 2015/0261057; 2015/0356927; 2015/0378235; 2016/077375; 2016/0103380; and 2016/0187759; and International Application Publication No. WO 00/38000; European Patents Nos. 1,099,207 B1 and 1,145,072 B1; all of the above-listed applications are incorporated by reference in their entireties.

This application is also related to U.S. Pat. Nos. 5,930,026; 6,445,489; 6,504,524; 6,512,354; 6,531,997; 6,753,999; 6,825,970; 6,900,851; 6,995,550; 7,012,600; 7,023,420; 7,034,783; 7,061,166; 7,061,662; 7,116,466; 7,119,772; 7,177,066; 7,193,625; 7,202,847; 7,242,514; 7,259,744; 7,304,787; 7,312,794; 7,327,511; 7,408,699; 7,453,445; 7,492,339; 7,528,822; 7,545,358; 7,583,251; 7,602,374; 7,612,760; 7,679,599; 7,679,813; 7,683,606; 7,688,297; 7,729,039; 7,733,311; 7,733,335; 7,787,169; 7,859,742; 7,952,557; 7,956,841; 7,982,479; 7,999,787; 8,077,141; 8,125,501; 8,139,050; 8,174,490; 8,243,013; 8,274,472; 8,289,250; 8,300,006; 8,305,341; 8,314,784; 8,373,649; 8,384,658; 8,456,414; 8,462,102; 8,537,105; 8,558,783; 8,558,785; 8,558,786; 8,558,855; 8,576,164; 8,576,259; 8,593,396; 8,605,032; 8,643,595; 8,665,206; 8,681,191; 8,730,153; 8,810,525; 8,928,562; 8,928,641; 8,976,444; 9,013,394; 9,019,197; 9,019,198; 9,019,318; 9,082,352; 9,171,508; 9,218,773; 9,224,338; 9,224,342; 9,224,344; 9,230,492; 9,251,736; 9,262,973; 9,269,311; 9,299,294; 9,373,289; 9,390,066; 9,390,661; and 9,412,314; and U.S. Patent Applications Publication Nos. 2003/0102858; 2004/0246562; 2005/0253777; 2007/0070032; 2007/0076289; 2007/0091418; 2007/0103427; 2007/0176912; 2007/0296452; 2008/0024429; 2008/0024482; 2008/0136774; 2008/0169821; 2008/0218471; 2008/0291129; 2008/0303780; 2009/0174651; 2009/0195568; 2009/0322721; 2010/0194733; 2010/0194789; 2010/0220121; 2010/0265561; 2010/0283804; 2011/0063314; 2011/0175875; 2011/0193840; 2011/0193841; 2011/0199671; 2011/0221740; 2012/0001957; 2012/0098740; 2013/

0063333; 2013/0194250; 2013/0249782; 2013/0321278; 2014/0009817; 2014/0085355; 2014/0204012; 2014/0218277; 2014/0240210; 2014/0240373; 2014/0253425; 2014/0292830; 2014/0293398; 2014/0333685; 2014/0340734; 2015/0070744; 2015/0097877; 2015/0109283; 2015/0213749; 2015/0213765; 2015/0221257; 2015/0262255; 2016/0071465; 2016/0078820; 2016/0093253; 2016/0140910; and 2016/0180777; all of the above-listed applications are incorporated by reference in their entireties.

Many of the aforementioned patents and applications recognize that the walls surrounding the discrete microcapsules in an encapsulated electrophoretic medium could be replaced by a continuous phase, thus producing a so-called polymer-dispersed electrophoretic display, in which the electrophoretic medium comprises a plurality of discrete droplets of an electrophoretic fluid and a continuous phase of a polymeric material, and that the discrete droplets of electrophoretic fluid within such a polymer-dispersed electrophoretic display may be regarded as capsules or microcapsules even though no discrete capsule membrane is associated with each individual droplet; see for example, the aforementioned U.S. Pat. No. 6,866,760, Accordingly, for purposes of the present application, such polymer-dispersed electrophoretic media are regarded as sub-species of encapsulated electrophoretic media.

A related type of electrophoretic display is a so-called "microcell electrophoretic display". In a microcell electrophoretic display, the charged particles and the fluid are not encapsulated within microcapsules but instead are retained within a plurality of cavities formed within a carrier medium, typically a polymeric film. See, for example, U.S. Pat. Nos. 6,672,921 and 6,788,449, both assigned to Sipix Imaging, Inc.

Although electrophoretic media are often opaque (since, for example, in many electrophoretic media, the particles substantially block transmission of visible light through the display) and operate in a reflective mode, many electrophoretic displays can be made to operate in a so-called "shutter mode" in which one display state is substantially opaque and one is light-transmissive. See, for example, U.S. Pat. Nos. 5,872,552; 6,130,774; 6,144,361; 6,172,798; 6,271,823; 6,225,971; and 6,184,856. Dielectrophoretic displays, which are similar to electrophoretic displays but rely upon variations in electric field strength, can operate in a similar mode; see U.S. Pat. No. 4,418,346. Other types of electro-optic displays may also be capable of operating in shutter mode. Electro-optic media operating in shutter mode may be useful in multi-layer structures for full color displays; in such structures, at least one layer adjacent the viewing surface of the display operates in shutter mode to expose or conceal a second layer more distant from the viewing surface.

An encapsulated electrophoretic display typically does not suffer from the clustering and settling failure mode of traditional electrophoretic devices and provides further advantages, such as the ability to print or coat the display on a wide variety of flexible and rigid substrates. (Use of the word "printing" is intended to include all forms of printing and coating, including, but without limitation: pre-metered coatings such as patch die coating, slot or extrusion coating, slide or cascade coating, curtain coating; roll coating such as knife over roll coating, forward and reverse roll coating; gravure coating; dip coating; spray coating; meniscus coating; spin coating; brush coating; air knife coating; silk screen printing processes; electrostatic printing processes; thermal printing processes; ink jet printing processes; electrophoretic deposition (See U.S. Pat. No. 7,339,715); and other similar techniques.) Thus, the resulting display can be flexible. Further, because the display medium can be printed, using a variety of methods, the display itself can be made inexpensively.

Other types of electro-optic materials may also be used in the present inventi on.

An electrophoretic display normally comprises a layer of electrophoretic material and at least two other layers disposed on opposed sides of the electrophoretic material, one of these two layers being an electrode layer. In most such displays both the layers are electrode layers, and one or both of the electrode layers are patterned to define the pixels of the display. For example, one electrode layer may be patterned into elongate row electrodes and the other into elongate column electrodes running at right angles to the row electrodes, the pixels being defined by the intersections of the row and column electrodes. Alternatively, and more commonly, one electrode layer has the form of a single continuous electrode and the other electrode layer is patterned into a matrix of pixel electrodes, each of which defines one pixel of the display. In another type of electrophoretic display, which is intended for use with a stylus, print head or similar movable electrode separate from the display, only one of the layers adjacent the electrophoretic layer comprises an electrode, the layer on the opposed side of the electrophoretic layer typically being a protective layer intended to prevent the movable electrode damaging the electrophoretic layer.

In yet another embodiment, such as described in U.S. Pat. No. 6,704,133, electrophoretic displays may be constructed with two continuous electrodes and an el ectrophoretic layer and a photoelectrophoretic layer between the electrodes. Because the photoelectrophoretic material changes resistivity with the absorption of photons, incident light can be used to alter the state of the electrophoretic medium. Such a device is illustrated in FIG. 1. As described in U.S. Pat. No. 6,704,133, the device of FIG. 1 works best when driven by an emissive source, such as an LCD display, located on the opposed side of the display from the viewing surface. In some embodiments, the devices of U.S. Pat. No. 6,704,133 incorporated special barrier layers between the front electrode and the photoelectrophoretic material to reduce "dark currents" caused by incident light from the front of the display that leaks past the reflective electro-optic media.

The aforementioned U.S. Pat. No. 6,982,178 describes a method of assembling a solid electro-optic display (including an encapsulated electrophoretic display) which is well adapted for mass production, Essentially, this patent describes a so-called "front plane laminate" ("FPL") which comprises, in order, a light-transmissive electrically-conductive layer; a layer of a solid electro-optic medium in electrical contact with the electrically-conductive layer; an adhesive layer; and a release sheet. Typically, the light-transmissive electrically-conductive layer will be carried on a light-transmissive substrate, which is preferably flexible, in the sense that the substrate can be manually wrapped around a drum (say) 10 inches (254 mm) in diameter without permanent deformation. The term "light-transmissive" is used in this patent and herein to mean that the layer thus designated transmits sufficient light to enable an observer, looking through that layer, to observe the change in display states of the electro-optic medium, which will normally be viewed through the electrically-conductive layer and adjacent substrate (if present); in cases where the electro-optic medium displays a change in reflectivity at non-visible wavelengths, the term "light-transmissive" should of course be interpreted to refer to transmission of the relevant non-visible wavelengths. The substrate will typically be a polymeric film, and will normally have a thickness in the range of about 1 to about 25 mil (25 to 634 µm), preferably about 2 to about 10 mil (51 to 254 µm). The electrically-conductive layer is conveniently a thin metal or metal oxide layer of, for example, aluminum or ITO, or may be a conductive polymer. Poly (ethylene terephthalate) (PET) films coated with aluminum or ITO are available commercially, for example as "aluminized Mylar" ("Mylar" is a Registered Trade Mark) from E.I. du Pont de Nemours & Company, Wilmington Del., and such commercial materials may be used with good results in the front plane laminate.

The aforementioned U.S. Pat. No. 6,982,178 also describes a method for testing the electro-optic medium in a front plane laminate prior to incorporation of the front plane laminate into a display. In this testing method, the release sheet is provided with an electrically conductive layer, and a voltage sufficient to change the optical state of the electro-optic medium is applied between this electrically conductive layer and the electrically conductive layer on the opposed side of the electro-optic medium. Observation of the electro-optic medium will then reveal any faults in the medium, thus avoiding laminating faulty electro-optic medium into a display, with the resultant cost of scrapping the entire display, not merely the faulty front plane laminate.

The aforementioned U.S. Pat. No. 6,982,178 also describes a second method for testing the electro-optic medium in a front plane laminate by placing an electrostatic charge on the release sheet, thus forming an image on the electro-optic medium. This image is then observed in the same way as before to detect any faults in the electro-optic medium.

Assembly of an electro-optic display using such a front plane laminate may be effected by removing the release sheet from the front plane laminate and contacting the adhesive layer with the backplane under conditions effective to cause the adhesive layer to adhere to the backplane, thereby securing the adhesive layer, layer of electro-optic medium and electrically-conductive layer to the backplane. This process is well-adapted to mass production since the front plane laminate may be mass produced, typically using roll-to-roll coating techniques, and then cut into pieces of any size needed for use with specific backplanes.

U.S. Pat. No. 7,561,324 describes a so-called "double release sheet" which is essentially a simplified version of the front plane laminate of the aforementioned U.S. Pat. No. 6,982,178. One form of the double release sheet comprises a layer of a solid electro-optic medium sandwiched between two adhesive layers, one or both of the adhesive layers being covered by a release sheet. Another form of the double release sheet comprises a layer of a solid electro-optic medium sandwiched between two release sheets. Both forms of the double release film are intended for use in a process generally similar to the process for assembling an electro-optic display from a front plane laminate already described, but involving two separate laminations; typically, in a first lamination the double release sheet is laminated to a front electrode to form a front sub-assembly, and then in a second lamination the front sub-assembly is laminated to a backplane to form the final display, although the order of these two laminations could be reversed if desired.

U.S. Pat. No. 7,839,564 describes a so-called "inverted front plane laminate", which is a variant of the front plane laminate described in the aforementioned U.S. Pat. No. 6,982,178. This inverted front plane laminate comprises, in order, at least one of a light-transmissive protective layer and a light-transmissive electrically-conductive layer; an adhesive layer; a layer of a solid electro-optic medium; and a release sheet. This inverted front plane laminate is used to form an electro-optic display having a layer of lamination adhesive between the electro-optic layer and the front electrode or front substrate; a second, typically thin layer of adhesive may or may not be present between the electro-optic layer and a backplane. Such electro-optic displays can combine good resolution with good low temperature performance.

The photoelectrophoretic properties of certain pigments were recognized some time ago. For example U.S. Pat. No. 3,383,993 discloses a photoelectrophoretic imaging apparatus that could be used to reproduce projected images on a medium, typically a transparent electrode, such as ITO, The photoelectrophoretic process described in the '993 patent, and other related patents by Xerox Corporation, was not reversible, however, because the photoelectrophoretic process involved the photoelectrophoretic particles migrating to an "injecting electrode" where they would become attached to the electrode. Because of the lack of reversibility, as well as the cost and complication of the setup, this phenomenon was not commercialized widely.

While displays of the invention are intended to display images for long periods of time with little to no energy input, the looped displays, described above, can be used to refresh content on the same time scale as emissive displays, e.g., large format LED displays. Displays of the invention can display two different images in less than one hour, e.g., in less than 10 minutes, e.g., in less than five minutes, e.g., in less than two minutes. Furthermore, the refresh periods can be staggered, depending upon the use of the display. For example, a transportation schedule may be refreshed every five minutes with an advertisement that lasts for 30 seconds, whereupon the transportation schedule is returned for another five minute period.

In some cases, one way of enabling the use of DC-imbalanced waveforms is discharging the display module after an active update. Where discharging involves short-circuiting the display's imaging film to drain away residual charges that builds-up on the imaging film (e.g., a layer of electrophoretic material) due to the DC imbalance drive. The use of update Post Drive Discharging (uPDD or UPD to be referred to herein) has successfully demonstrated the reduction in the build-up of residual charges (as measured by the remnant voltage) and the corresponding module polarization that would have resulted in permanent degradation of the imaging film due to electrochemistry.

It has now been found that remnant voltage is a more general phenomenon in electrophoretic and other impulse-driven electro-optic displays, both in cause(s) and effect(s). It has also been found that DC imbalances may cause long-term lifetime degradation of some electrophoretic displays.

There are multiple potential sources of remnant voltage. It is believed (although some embodiments are in no way limited by this belief), that a primary cause of remnant voltage is ionic polarization within the materials of the various layers forming the display.

Such polarization occurs in various ways. In a first (for convenience, denoted "Type I") polarization, an ionic double layer is created across or adjacent a material interface. For example, a positive potential at an indium-tin-oxide ("ITO") electrode may produce a corresponding polarized layer of negative ions in an adjacent laminating adhesive. The decay rate of such a polarization layer is associated with the recombination of separated ions in the lamination adhesive layer. The geometry of such a polarization layer is determined by the shape of the interface, but may be planar in nature.

In a second ("Type II") type of polarization, nodules, crystals or other kinds of material heterogeneity within a single material can result in regions in which ions can move or less quickly than the surrounding material. The differing rate of ionic migration can result in differing degrees of charge polarization within the bulk of the medium, and polarization may thus occur within a single display component. Such a polarization may be substantially localized in nature or dispersed throughout the layer.

In a third ("Type III") type of polarization, polarization may occur at any interface that represents a barrier to charge transport of any particular type of ion. One example of such an interface in a microcavity electrophoretic display is the boundary between the electrophoretic suspension including the suspending medium and particles (the "internal phase") and the surrounding medium including walls, adhesives and binders (the "external phase"). In many electrophoretic displays, the internal phase is a hydrophobic liquid whereas the external phase is a polymer, such as gelatin. Ions that are present in the internal phase may be insoluble and non-diffusible in the external phase and vice versa. On the application of an electric field perpendicular to such an interface, polarization layers of opposite sign will accumulate on either side of the interface. When the applied electric field is removed, the resulting non-equilibrium charge distribution will result in a measurable remnant voltage potential that decays with a relaxation time determined by the mobility of the ions in the two phases on either side of the interface.

Polarization may occur during a drive pulse. Each image update is an event that may affect remnant voltage. A positive waveform voltage can create a remnant voltage across an electro-optic medium that is of the same or opposite polarity (or nearly zero) depending on the specific electro-optic display.

It will be evident from the foregoing discussion that polarization may occur at multiple locations within the electrophoretic or other electro-optic display, each location having its own characteristic spectrum of decay times, principally at interfaces and at material heterogeneities. Depending on the placement of the sources of these voltages (in other words, the polarized charge distribution) relative to the electro-active parts (for example, the electrophoretic suspension), and the degree of electrical coupling between each kind of charge distribution and the motion of the particles through the suspension, or other electro-optic activity, various kinds of polarization will produce more or less deleterious effects. Since an electrophoretic display operates by motion of charged particles, which inherently causes a polarization of the electro-optic layer, in a sense a preferred electrophoretic display is not one in which no remnant voltages are always present in the display, but rather one in which the remnant voltages do not cause objectionable electro-optic behavior. Ideally, the remnant impulse will be minimized and the remnant voltage will decrease below 1 V, and preferably below 0.2 V, within 1 second, and preferably within 50 ms, so that that by introducing a minimal pause between image updates, the electrophoretic display may affect all transitions between optical states without concern for remnant voltage effects. For electrophoretic displays operating at video rates or at voltages below +/−15 V these ideal values should be correspondingly reduced. Similar considerations apply to other types of electro-optic display.

To summarize, remnant voltage as a phenomenon is at least substantially a result of ionic polarization occurring within the display material components, either at interfaces or within the materials themselves. Such polarizations are especially problematic when they persist on a meso time scale of roughly 50 ms to about an hour or longer. Remnant voltage can present itself as image ghosting or visual artifacts in a variety of ways, with a degree of severity that can vary with the elapsed times between image updates. Remnant voltage can also create a DC imbalance and reduce ultimate display lifetime. The effects of remnant voltage therefore may be deleterious to the quality of the electrophoretic or other electro-optic device and it is desirable to minimize both the remnant voltage itself, and the sensitivity of the optical states of the device to the influence of the remnant voltage.

In practice, charges built up within an electrophoretic material due to polarization effect described above may be discharged or drained to mitigate the remnant voltage effect. In some embodiment, such discharge may be performed after an update or drive sequence.

In some embodiments, a post-drive or post-update discharging may be performed using a readily available thin-film-transistor (TFT) backplane 100 for an EPI and the EPD's controller circuitry, as illustrated in FIG. 1. In use, each display pixel may include a thin film transistor UPD (e.g., $TFT_{(upd)}$) 102 that can be configured to provide a certain degree of electrical conduction such that the display's top plane 106 and source (or data) line VS are held at the same voltage potential for some time (e.g., ground). The above mentioned patent application Ser. No. 15/014,236, which is incorporated herein in its entirety, discusses such driving method in more detail. The display pixel 100 as illustrated herein, as well as the various embodiments illustrated below, usually include an electrophoretic material 108 positioned between an pixel electrode 104 and the top plane 106, where the top plane 106 may include a substrate and a common electrode, and the common electrode can be a transparent conductive layer. Normally, the $TFT_{(upd)}$ 102 is designed to function as the pixel controlling transistor for providing or transmitting driving waveforms to the pixel's pixel electrode 104. As such, the $TFT_{(upd)}$ 102 is usually configured to operate in a conduction state (i.e., the "ON" state) for a very short amount of time in comparison to the non-conduction state (i.e., the "OFF" state), for example, in the ratio of more than 1:1000 of "ON" time over "OFF" time. While the use of uPDD will change this ratio to about 1:2 or 1:50 depending on the uPDD configurations, which leads to positive bias stress after long terms of usage, in some cases the usage will amount to stress normally caused by tens of thousands of image updates or more. Positive bias stress is known to cause threshold voltage shifts in amorphous silicon TFTs that is permanent. A shift in threshold voltage can result in behavior changes to the affected TFT and the TFT backplane, which in turn results in optical shifts in the optical performances of the EPD. The optical shift due to uPDD has been observed and is illustrated in FIGS. 2A and 2B. As shown, due to uPDD, display gray-tone (FIG. 2A) and ghosting shift (FIG. 2B) values can increase significantly in a two year period after tens of thousands update cycles.

With using only a single TFT such as the $TFT_{(upd)}$ 102 illustrated in FIG. 1, normal image updates and uPDDs are both achieved through the same TFT (i.e., $TFT_{(upd)}$). Alternatively, in some embodiments, an additional TFT may be added to each pixel and used solely for the uPDD discharging scheme. While the overall discharging scheme remains the same, the pixel TFT (e.g., $TFT_{(upd)}$ 102 of FIG. 1) that is used for normal display operation will be used only for active display updates, just like in standard active-matrix driving of EPDs that do not incorporate the discharging. This configuration ensures that the performance of the pixel TFT used for normal display operation is stable and unaffected by the discharging. While the additional TFT used for discharging may experience threshold voltage shift due to positive bias stress but this will not cause optical shifts in the EPD, and this will not affect the discharging operation as long as the TFT is turned on during discharging (i.e., as long as the potential threshold voltage shift is account for by the discharging scheme). Such configuration can allow for stable display operation without optical response shifts while at the same time allowing for DC-imbalanced waveforms as enabled by post-drive discharging.

Figure 3:
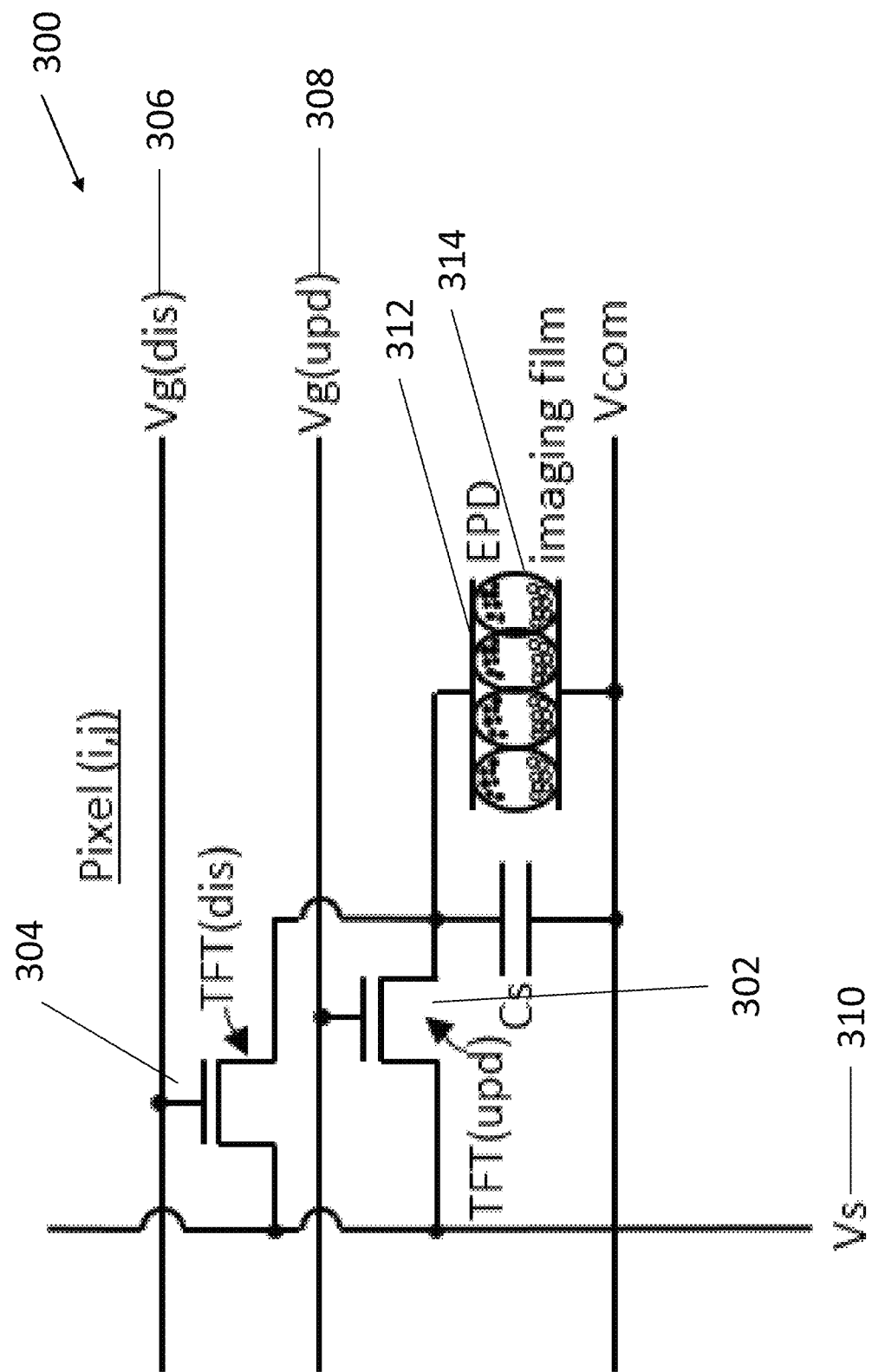
FIG. 3 is an exemplary pixel design in accordance with the subject matter presented herein to enable the use of post-drive discharging without introducing optical shifts.

One exemplary embodiment in accordance with the concept described above is illustrated in FIG. 3. In addition to the standard pixel TFT (e.g., $TFT_{(upd)}$ 302), a display pixel 300 may include an active component dedicated for draining the remnant voltage or excessive charges from the electrophoretic film 314. This active component may be a transistor of any kind (e.g., TFT, CMOS etc.) or any other component that may be activated or turned on by an application of an electrical (e.g., voltage) or optical energy, devices such as a diode or a photo detector/diode, or any electrically/optically activated switch in general. For the purpose of illustrating the general concept, a TFT (e.g., an n-type ITT) is used herein, but it should be appreciated that this is not meant to serve as the limitation. As illustrated in FIG. 3, a designated transistor $TFT_{(upd)}$ 304 may be used for the purpose of discharging the charges of the remnant voltage within the electrophoretic imaging film 314. In this configuration, the gate of the $TFT_{(upd)}$ 302 is connected to the select lines (e.g., Vg(upd) 308) from the gate driver outputs, while the gate of the $TFT_{(dis)}$ 304 is connected to a discharge select line such as the Vg(dis) 306, where this select line may be used to turn on and off the $TFT_{(dis)}$ 304 at its gate (e.g., by supply a voltage to the transistor's gate through the select line to affect the gate-source or gate-drain potential). In one embodiment, all the pixel discharge select lines for multiple pixels may be connected together to a single display output such as to turn on all the pixel discharge TFT (e.g., $TFT_{(dis)}$ 304) transistors of all the display pixels of a display at the same time for simultaneous discharging of the whole display. In some embodiment, the source lines of the $TFT_{(upd)}$ 302 and the $TFT_{(dis)}$ 304 may be both connected to the data lines Vs 310. During operations, the $TFT_{(dis)}$ 304 may be turned off for all the pixels while the $TFT_{(upd)}$ 302 is used for active updating of the display. During discharging, the $TFT_{(dis)}$ 304 can be turned on while the $TFT_{(upd)}$ 302 may be turned off. In some embodiments, either or both the $TFT_{(upd)}$ 302 and $TFT_{(dis)}$ 304 may be an n-type transistor. In that case, the source of the $TFT_{(upd)}$ 302 may be electrically coupled to the source line Vs 310, and the drain of the $TFT_{(upd)}$ 302 may be coupled to the pixel electrode 312 of the display pixel 300. In addition, if the $TFT_{(dis)}$ 304 transistor is an n-type transistor, its source may be coupled to the source line Vs 310, while its drain may be coupled to the pixel electrode 312. In practice, when the $TFT_{(dis)}$ 304 is turned on and conducting, charges from the electrophoretic film 314 may be drained or discharged through the $TFT_{(dis)}$ 304 and/or the source line Vs 310.

Figure 4:
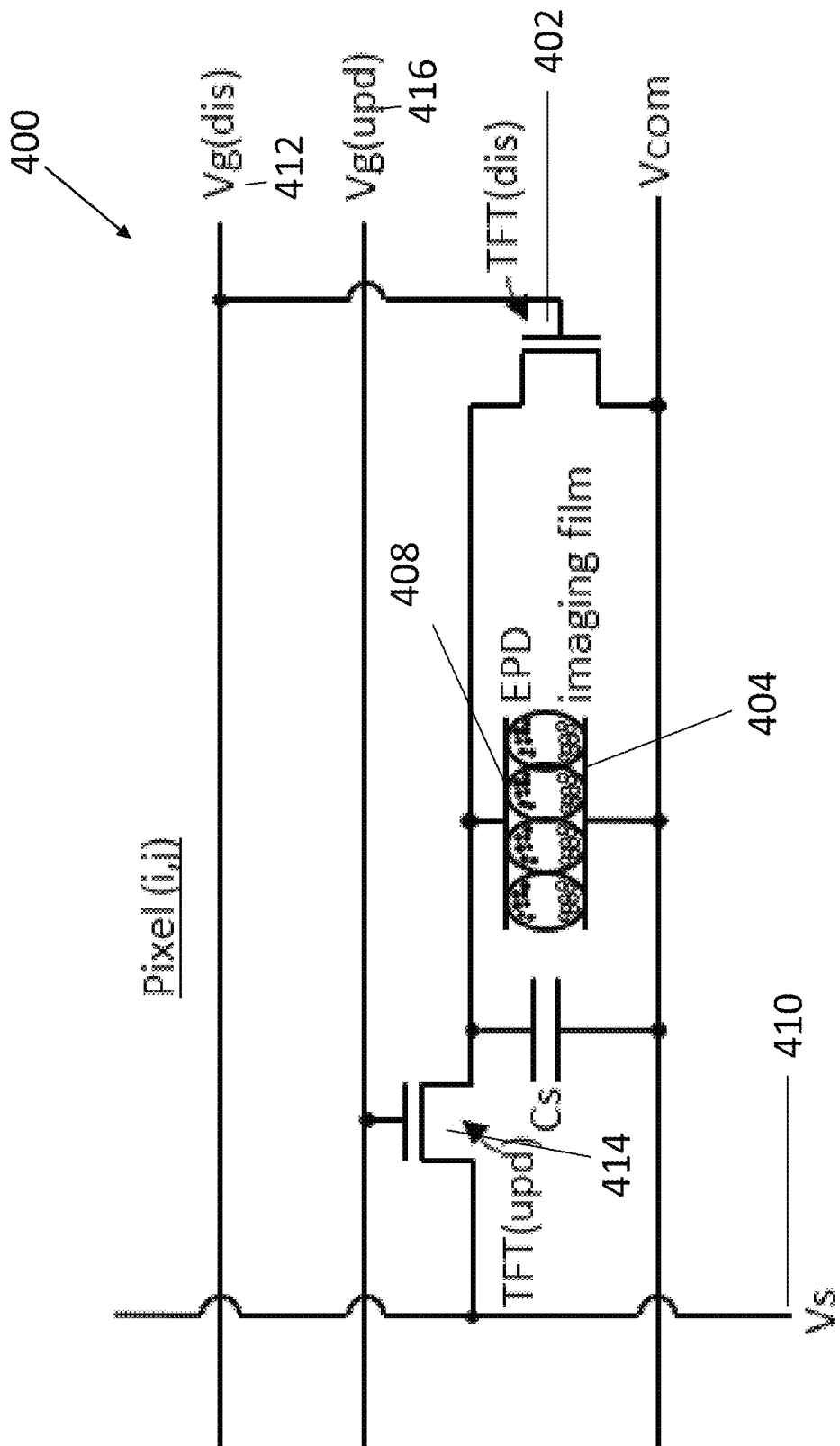
FIG. 4 is another pixel design in accordance with the subject matter presented herein to enable the use of post-drive discharging without introducing optical shifts.

FIG. 4 illustrates another embodiment of a display pixel 400 in accordance with the subject matter presented herein. In this embodiment, a discharge $TFT_{(dis)}$ 402 may be electrically coupled to an EPD's top plane 404 (e.g., connected to the ETD's common electrode) and the Vcom 406 voltage line as shown in FIG. 4 (e.g., the discharge TFT's 402 drain is directly coupled to the EPD's top plane 404, while its source is coupled to pixel's pixel electrode 408). In this configuration, the discharging of the display module does not occur through the source drivers (e.g., Vs 410) but instead is done directly through the top plane connection. In addition, with this setup, it is possible to discharge the display during an update by putting the discharge $TFT_{(dis)}$ 402 in a weakly conductive state as to act as a resistive or conductive path for discharging, because the Vs 410 is not connected to the discharge $TFT_{(dis)}$ 402 in this case and therefore does not influence its operation. In this configuration, the $TFT_{(dis)}$ 402 may be activated through the select line $Vg_{(dis)}$ 412, while the transistor $TFT_{(upd)}$ 414 may be activated by through the select line $Vg_{(upd)}$ 416, where the two select lines $Vg_{(dis)}$ 412 and $Vg_{(upd)}$ 416) may be optionally not electrically coupled.

Figure 5:
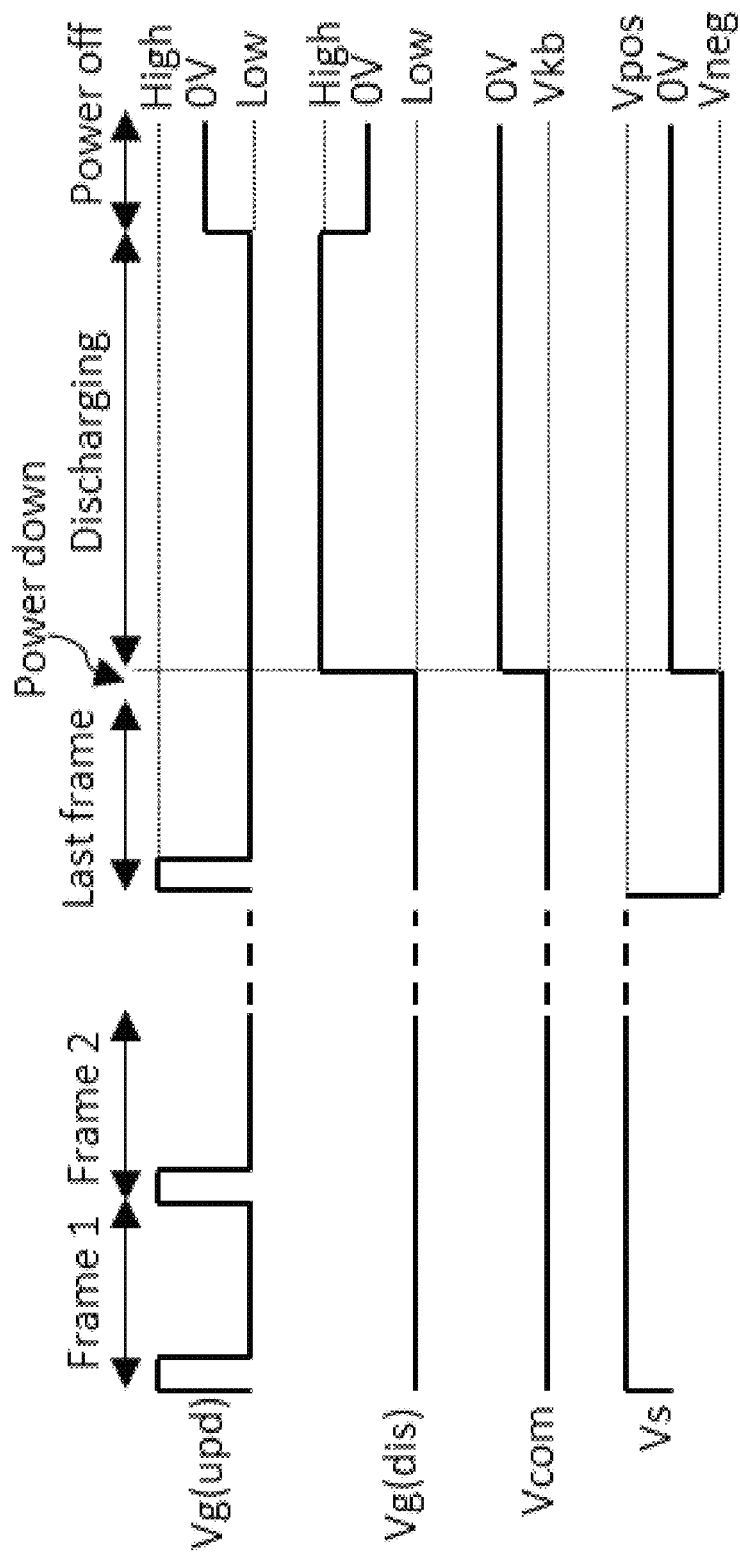
FIG. 5 are voltage sequences for an active update followed by a discharge.

FIG. 5 illustrates an exemplary voltage sequence that may be applicable to either of the two proposed pixel designs presented in FIGS. 3 and 4. This voltage sequence ignores potential RC time constraints that may appear when switching from one voltage to another or that may be introduced during power down for example. $Vg_{(upd)}$ is connected to the select line, as in standard active-matrix driving, switching between a high and a low voltage to turn on and off the TFT. During the active update, Vcom may be held constant at a voltage that is typically equal to the kickback voltage of $TFT_{(upd)}$. Vs is connected to the data line that provides the data signal to refresh the pixel with the desired waveform. $Vg_{(dis)}$ is connected to a low voltage in order to keep $TFT_{(dis)}$ turned off. During discharging after the active update, $Vg_{(upd)}$ is turned off, and Vcom and Vs are held at 0V $Vg_{(dis)}$ is turned on in order to short-circuit the electrophoretic imaging film through $TFT_{(dis)}$. The voltage sequence shown in FIG. 5 is an exemplary illustration of the discharging scheme using the new TFT pixel design. This new TFT pixel design is flexible enough to accommodate more complicated implementations of the discharging scheme. The main idea is that the discharging happens by turning on a dedicated TFT while leaving the pixel TFT used for normal display operation out of the discharging operation. Secondary effects may include the possibility that the kickback voltage experienced by the $TFT_{(dis)}$ when turning off at the end of discharging may affect the discharging efficacy or optical performance of the display. Such effects may be mitigated by implementing properly designed power-down circuitry for $Vg_{(dis)}$ with certain RC decay in order to prevent or minimize such effects.

Figure 6:
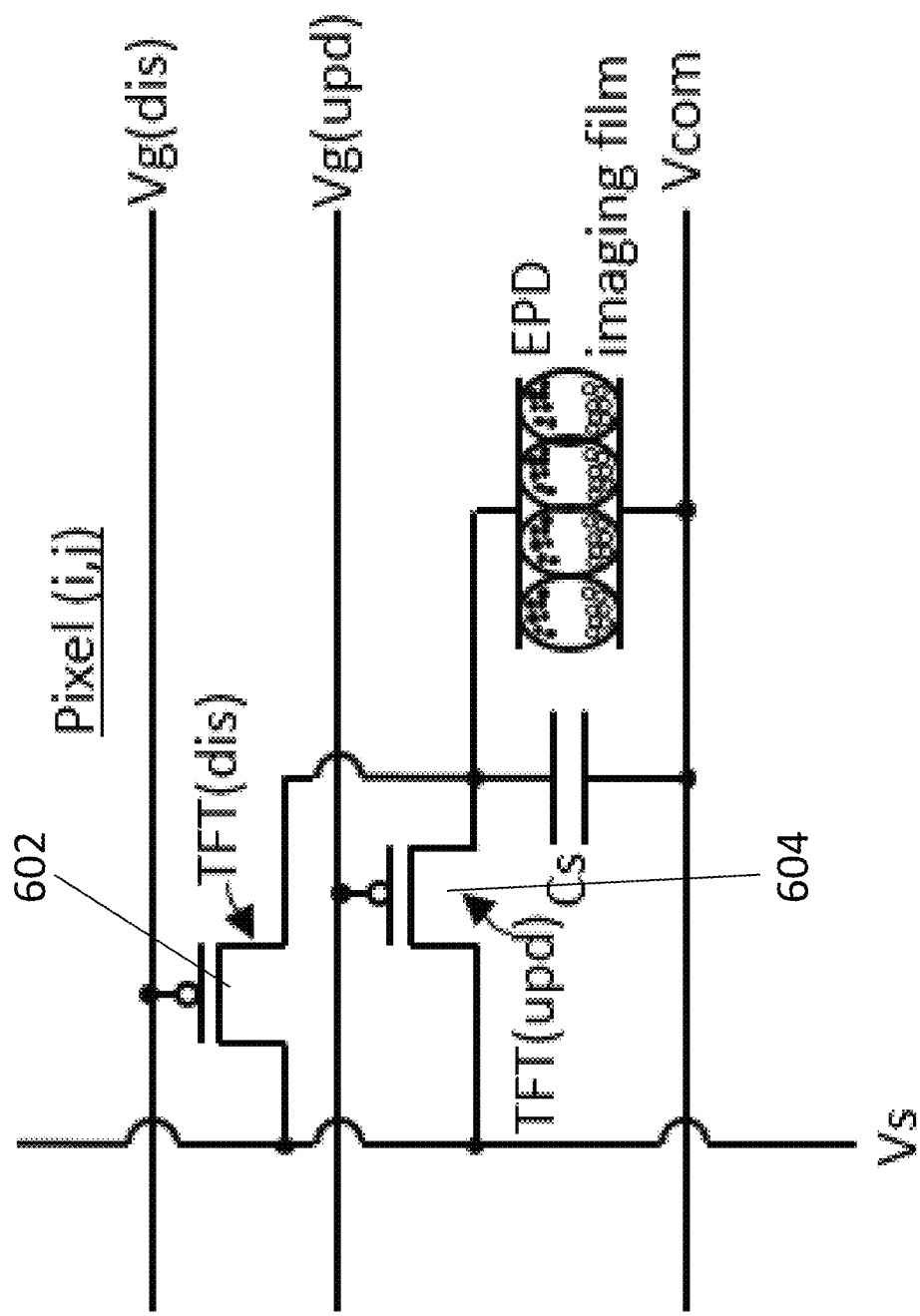
FIG. 6 is another pixel design in accordance with the subject matter presented herein to enable the use of post-drive discharging without introducing optical shifts.

In the description above, the $TFT_{(upd)}$ and $TFT_{(dis)}$ are both N-type TFTs. These transistors could also be both P-type TFT or N-type and P-type each. One of the example based on the circuit in FIG. 3 is shown in FIG. 6, where both the $TFT_{(upd)}$ 604 and $TFT_{(dis)}$ 602 are P-type TFTs. The same could be done for the circuit in FIG. 4 (not shown here).

Figure 7:
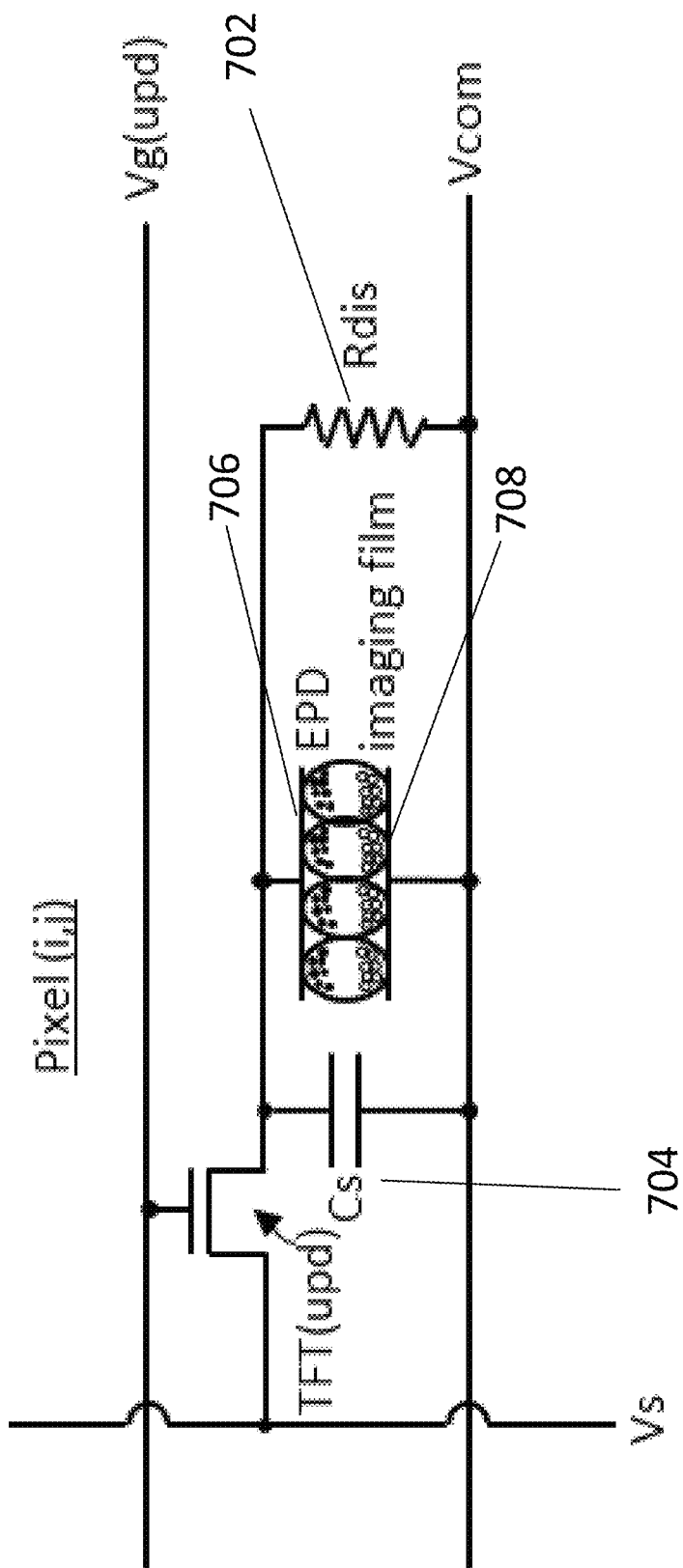
FIG. 7 is yet another pixel design in accordance with the subject matter presented herein to enable the use of post-drive discharging without introducing optical shifts.

Alternatively, instead of an active component such as a TFT, passive components can also be adopted to discharge the EPD. FIG. 7 shows another possible implementation of the subject matter presented herein where a resistor $R_{dis}$ 702 is placed in parallel with the storage capacitor Cs 704 of the pixel. As shown, resistor $R_{dis}$ 702 is also coupled to both the pixel electrode 706 and the common electrode 708. The purpose of this resistor is to provide a pathway to discharge the remnant voltage from the electrophoretic imaging film at the end of a driving period. The benefit of this pixel design is that it does not require adding an extra line $Vg_{dis}$ to control the second TFT. However, since $R_{dis}$ 702 now has a fixed resistance value, the resistance value of $R_{dis}$ 702 needs to be designed appropriately. For example, the RC constant $R_{dis}$ 702 associated with the addition of $R_{dis}$ 702 to the pixel circuit needs to be larger than the driving frame time in order to achieve the required pixel voltage holding characteristics during the frame time. This RC constant also needs to be low enough to provide sufficient discharging at the end of the driving period. In some other embodiments, the $R_{dis}$ 702 may also be replaced with a field switchable shunt resistor using amorphous silicon or any other technologies that provide an appropriate resistance in parallel with the electrophoretic imaging film for discharging without preventing normal driving operation.

In addition to providing a dedicated TFT used only for discharging, and another TFT used only for display update in order to avoid optical shifts in the display performance due to positive bias stress, the subject matter presented herein also enables some additional usage modes that could be beneficial as described below.

Figure 8:
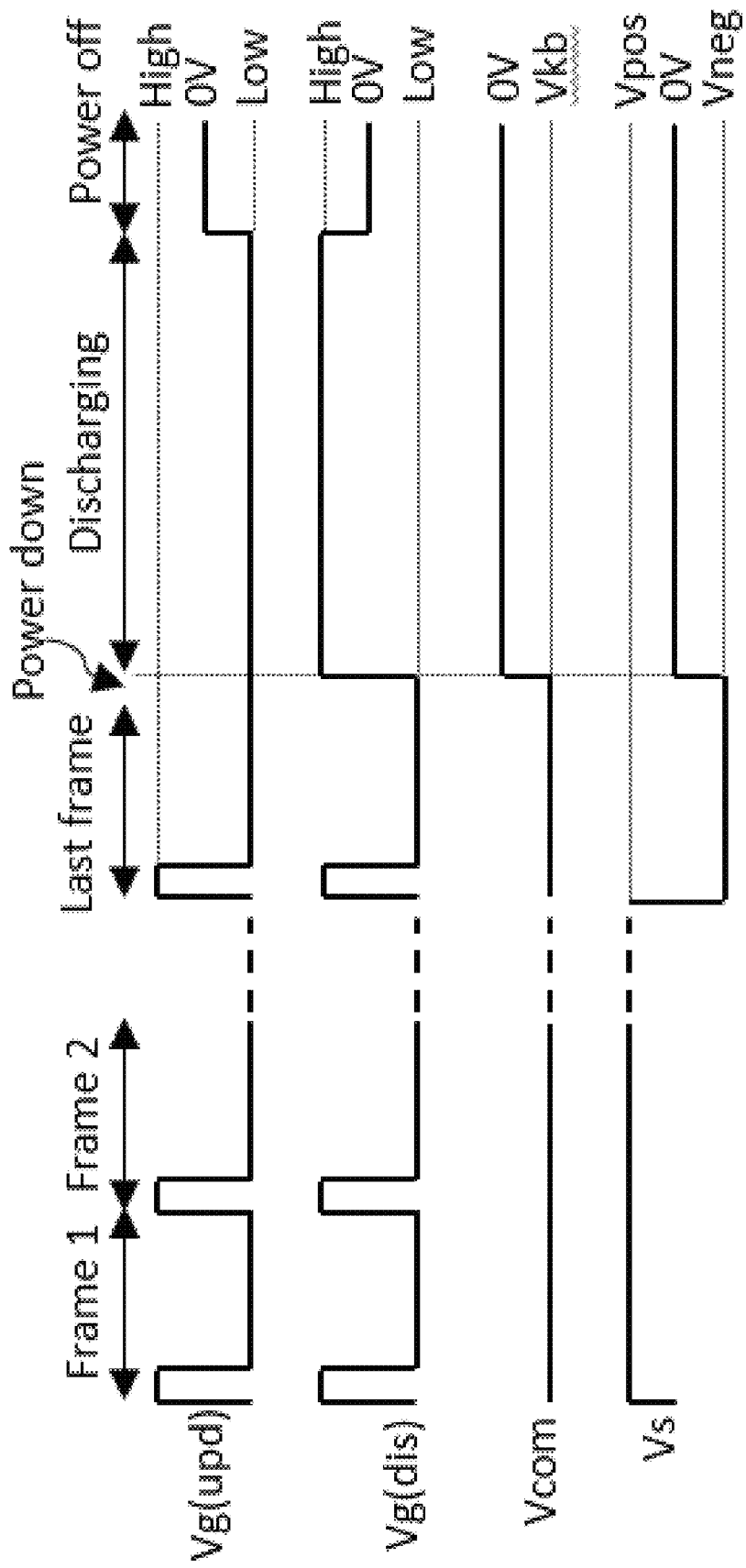
FIG. 8 are voltage sequences for an active update followed by discharging.

FIG. 8 shows an exemplary voltage sequence applicable only to the circuitry presented in FIG. 3 where the $TFT_{upd}$ 302 and $TFT_{dis}$ 304 have dedicated gate lines. In this voltage sequence, the $TFT_{upd}$ 302 and the $TFT_{dis}$ 304 are both turned on during the active update stage, while the $TFT_{dis}$ 304 may or may not be turned on at the end of the update for discharging. In this usage mode, the $TFT_{dis}$ 304 could provide extra current for faster pixel charging that could enable for example higher frame rate driving. Furthermore, the $TFT_{dis}$ 304 in proposed pixel designs can also be used as a global update transistor. By turning on $TFT_{dis}$ 304 and turning off $TFT_{upd}$ 302, we could prevent long term positive bias on $TFT_{upd}$ 302 when the global update is performed.

As such, the subject matter presented herein introduces a way to enable DC-imbalance waveforms by making use of post-drive discharging and its various implementations without creating a positive bias stress on the pixel TFT used for standard active-matrix driving display operations. This results in more stable display optical response while at the same time enabling post-drive discharging.

It will be apparent to those skilled in the art that numerous changes and modifications can be made to the specific embodiments of the invention described above without departing from the scope of the invention. Accordingly, the whole of the foregoing description is to be interpreted in an illustrative and not in a limitative sense.

The invention claimed is:

1. A thin film transistor (TFT) backplane comprising a plurality of electrodes, each of the plurality of electrodes being coupled to circuitry comprising:
   a first thin film transistor OTT coupled to the electrode for transmitting waveforms to the electrode; and
   a second TFT coupled to the electrode for discharging remnant charges from the electrode;
   wherein the second TFT is activated subsequent to the first TFT being deactivated.

2. The TFT backplane of claim 1 further comprising a first select line coupled to the first TFT for activating the first TFT.

3. The TFT backplane of claim 2 further comprising a second select line coupled to the second TFT for activating the second TFT, wherein the second select line and the first select line are not electrically connected.

4. The TFT backplane of claim 1 wherein the first TFT and the second TFT are n-type TFTs.

5. The TFT backplane of claim 1 further comprising a common electrode and an electrowetting material positioned between the common electrode and one of the plurality of electrodes.

6. The TFT backplane of claim 5 wherein the drain of the first TFT and the drain of the second TFT are coupled to the common electrode.

7. A method for discharging remnant voltage from a TFT backplane, the TFT backplane comprising a plurality of electrodes, each of the plurality of electrodes being coupled to circuitry comprising: a first thin film transistor (TFT) coupled to the electrode for transmitting waveforms to the electrode; and a second TFT coupled to the electrode for discharging remnant charges from the electrode, the method comprising:
   activating the first TFT;
   deactivating the first TFT; and
   activating the second TFT, subsequent to the deactivation of the first TFT, to discharge remnant charges from the electrode.

8. The method of claim 7, wherein the activating the second TFT to discharge remnant charges further comprises discharging the charges from an electrowetting material.

* * * * *